(12) United States Patent
Lim et al.

(10) Patent No.: US 9,345,011 B2
(45) Date of Patent: May 17, 2016

(54) METHOD AND TERMINAL OF TRANSMITTING AN UPLINK SIGNAL WITH FEWER TRANSMISSION RESOURCE BLOCKS TO PREVENT A LOWERING IN REFERENCE SENSITIVITY IN INTRA-BAND NON-CONTIGUOUS UPLINK CARRIER AGGREGATION

(71) Applicant: LG ELECTRONICS INC., Seoul (KR)

(72) Inventors: Su Hwan Lim, Seoul (KR); Young Woong Kim, Seoul (KR); Young Goo Park, Seoul (KR); Sang Wook Lee, Seoul (KR); Dong Ik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/692,628

(22) Filed: Apr. 21, 2015

(65) Prior Publication Data

US 2015/0230240 A1  Aug. 13, 2015

Related U.S. Application Data

(63) Continuation of application No. 14/160,150, filed on Jan. 21, 2014, now Pat. No. 9,125,195.

(60) Provisional application No. 61/754,933, filed on Jan. 21, 2013.

(30) Foreign Application Priority Data

Jan. 14, 2014 (KR) .......................... 10-2014-0004329

(51) Int. Cl.
*H04W 72/04* (2009.01)
*H04L 5/00* (2006.01)

(52) U.S. Cl.
CPC ............. *H04W 72/0413* (2013.01); *H04L 5/00* (2013.01); *H04L 5/001* (2013.01); *H04W 72/0453* (2013.01); *H04W 72/0493* (2013.01); *H04W 72/0406* (2013.01); *H04W 72/0486* (2013.01)

(58) Field of Classification Search
None
See application file for complete search history.

(56) References Cited

U.S. PATENT DOCUMENTS 8,279,828 B1 * 10/2012 Maples ................. H04L 5/0073
370/208
8,462,724 B1 * 6/2013 Immonen ................ H04W 4/00
370/282

(Continued)

FOREIGN PATENT DOCUMENTS

KR  10-2011-0017461  2/2011
KR  10-2011-0084964  7/2011

(Continued)

OTHER PUBLICATIONS

Korean Intellectual Property Office Application Serial No. 10-2014-0004329, Notice of Allowance dated Jun. 10, 2014, 2 pages.

(Continued)

*Primary Examiner* — Jenee Williams
(74) *Attorney, Agent, or Firm* — Lee, Hong, Degerman, Kang & Waimey; Jonathan Kang; Harry Lee

(57) ABSTRACT

There is provided a method of transmitting an uplink for reference sensitivity test for intra-band non-contiguous CA in LTE-A system. The method may comprise: if a carrier aggregation (CA) is configured, if the configured CA corresponds to an intra-band CA, and if the configured CA corresponds to non-contiguous CA, transmitting an uplink on a primary component carrier using allocated resource blocks (RBs). if a channel bandwidth by an aggregation of the primary component carrier and a secondary component carrier is at least one of 25 RBs, 50 RBs, 75 RBs and 100 RBs and if a gap between two sub-blocks corresponds to a predetermined range, the number of the allocated resource block (RB) in the primary component carrier may be limited to 10 to meet a requirement for a reference sensitivity on a downlink of the secondary component carrier.

18 Claims, 25 Drawing Sheets

(56) References Cited

U.S. PATENT DOCUMENTS

| | | | |
|---|---|---|---|
| 2005/0176375 A1* | 8/2005 | Bednasz | G01R 29/10 455/67.12 |
| 2011/0026415 A1* | 2/2011 | Kamuf | H04W 72/0453 370/252 |
| 2011/0045863 A1* | 2/2011 | Lee | H04L 5/0007 455/517 |
| 2011/0134861 A1* | 6/2011 | Seo | H04W 72/1289 370/329 |
| 2012/0083309 A1* | 4/2012 | Kwon | H04B 17/382 455/522 |
| 2012/0087317 A1* | 4/2012 | Bostrom | H04W 52/30 370/329 |
| 2012/0106477 A1* | 5/2012 | Kwon | H04W 52/365 370/329 |
| 2012/0176958 A1* | 7/2012 | Queseth | H04B 7/15542 370/315 |
| 2013/0028204 A1* | 1/2013 | Dinan | H04W 72/0453 370/329 |
| 2013/0051261 A1* | 2/2013 | Kazmi | H04B 7/0693 370/252 |
| 2013/0090146 A1* | 4/2013 | Kwon | H04W 52/365 455/509 |
| 2013/0142098 A1* | 6/2013 | Kwon | H04W 52/04 370/311 |
| 2013/0163543 A1* | 6/2013 | Freda | H04W 72/0406 370/329 |
| 2013/0188580 A1* | 7/2013 | Dinan | H04W 52/281 370/329 |
| 2013/0194987 A1* | 8/2013 | Immonen | H04W 52/367 370/311 |
| 2013/0242880 A1* | 9/2013 | Miao | H04L 5/001 370/329 |
| 2013/0252603 A1* | 9/2013 | Immonen | H04W 8/24 455/422.1 |
| 2013/0322370 A1* | 12/2013 | Fong | H04W 72/048 370/329 |
| 2014/0036664 A1* | 2/2014 | Han | H04W 76/048 370/230 |
| 2014/0036704 A1* | 2/2014 | Han | H04W 28/12 370/252 |
| 2014/0369244 A1* | 12/2014 | Han | H04W 76/046 370/280 |

FOREIGN PATENT DOCUMENTS

| | | |
|---|---|---|
| KR | 10-2012-0015228 | 2/2012 |
| WO | 2012/036378 | 3/2012 |
| WO | 2012036378 | 3/2012 |

OTHER PUBLICATIONS

Nokia Corporation, "Non-contiguous intra-band CA UE RF aspects", R4-114901, 3GPP TSG-RAN WG4 Meeting #60bis, Oct. 2011, 7 pages.

LG Electronics, "General MPR mask for intra-band non-contiguous CA", R4-126133, 3GPP TSG RAN WG4 Meeting #65, Nov. 2012, 5 pages.

PCT International Application No. PCT/KR2014/000550, International Search Report dated Apr. 18, 2014, 3 pages.

* cited by examiner (a)

(b)

(a)

(b)

METHOD AND TERMINAL OF TRANSMITTING AN UPLINK SIGNAL WITH FEWER TRANSMISSION RESOURCE BLOCKS TO PREVENT A LOWERING IN REFERENCE SENSITIVITY IN INTRA-BAND NON-CONTIGUOUS UPLINK CARRIER AGGREGATION

CROSS-REFERENCE TO RELATED APPLICATIONS

This application is a continuation of U.S. patent application Ser. No. 14/160,150, filed on Jan. 21, 2014, now U.S. Pat. No. 9,125,195, which claims the benefit of earlier filing date and right of priority to Korean Patent Application No. 10-2014-0004329, filed on Jan. 14, 2014, and also claims the benefit of U.S. Provisional Application Ser. No. 61/754,933, filed on Jan. 21, 2013, the contents of which are all incorporated by reference herein in their entirety.

TECHNICAL FIELD

The present invention concerns a method and terminal of transmitting an uplink signal with fewer transmission resource blocks to prevent a lowering in reference sensitivity in intra-band non-contiguous uplink carrier aggregation.

BACKGROUND ART

3GPP (3rd Generation Partnership Project) LTE (Long Term Evolution) that is an advancement of UMTS (Universal Mobile Telecommunication System) is being introduced with 3GPP release 8.

In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

FIG. 1 illustrates a 3GPP LTE wireless communication system.

As can be seen from FIG. 1, the wireless communication system includes at least one base station (BS) 20. Each base station 20 offers a communication service in a specific geographical area (generally denoted cell) 20a, 20b, and 20c.

At this time, communication from the base station to a terminal is denoted downlink (DL), and communication from the terminal to the base station is denoted uplink (UL).

Recently, development of 3GPP LTE-A (advanced) that is an evolution of 3GPP LTE is almost done. In LTE-A, carrier aggregation is used.

DISCLOSURE OF THE INVENTION

However, reference sensitivity of reception may be lowered due to transmission leakage in carrier aggregation.

Accordingly, an embodiment of this disclosure aims to avoid a lowering in reception sensitivity by restricting a resource block (RB).

To achieve these and other advantages and in accordance with the purpose of the present disclosure, as embodied and broadly described herein, there is provided a method of transmitting an uplink. The method may comprise: if a carrier aggregation (CA) is configured, if the configured CA corresponds to an intra-band CA, and if the configured CA corresponds to non-contiguous CA, transmitting an uplink on a primary component carrier using allocated resource blocks (RBs). if a channel bandwidth by an aggregation of the primary component carrier and a secondary component carrier is at least one of 25 RBs, 50 RBs, 75 RBs and 100 RBs and if a gap between two sub-blocks corresponds to a predetermined range, the number of the allocated resource block (RB) in the primary component carrier may be limited to 10 to meet a requirement for a reference sensitivity on a downlink of the secondary component carrier.

To achieve the above aspect of this specification, there is provided a terminal. The terminal may comprise: a transceiver configured to transmit an uplink on a primary component carrier using allocated resource blocks (RBs) if a carrier aggregation (CA) is configured, if the configured CA corresponds to an intra-band CA, and if the configured CA corresponds to non-contiguous CA. If a channel bandwidth by an aggregation of the primary component carrier and a secondary component carrier is at least one of 25 RBs, 50 RBs, 75 RBs and 100 RBs and if a gap between two sub-blocks corresponds to a predetermined range, the number of the allocated resource block (RB) in the primary component carrier is limited to 10 to meet a requirement for a reference sensitivity on a downlink of the secondary component carrier.

The primary and secondary component carriers may correspond to band 25 in LTE/LTE-A standard.

The predetermined range for the gap may be varied according to the channel bandwidth of the primary component carrier and the channel bandwidth of the secondary component carrier.

The predetermined range for the gap may be varied according to whether the channel bandwidth of the primary component carrier is 25 RBs or 50 RBs and according to whether the channel bandwidth of the secondary component carrier is 25 RBs or 50 RBs.

If a channel bandwidth of the primary component carrier is 25 RB, if a channel bandwidth of the secondary component carrier is 25 RB and if the gap is greater than 30 MHz, but less than 55 MHz, the number of RB may be limited to 10.

If a channel bandwidth of the primary component carrier is 25 RB, if a channel bandwidth of the secondary component carrier is 50 RB and if the gap is greater than 25 MHz, but less than 50 MHz, the number of RB may be limited to 10.

if a channel bandwidth of the primary component carrier is 50 RB, if a channel bandwidth of the secondary component carrier is 25 RB and if the gap is greater than 15 MHz, but less than 50 MHz, the number of RB may be limited to 10.

If a channel bandwidth of the primary component carrier is 50 RB, if a channel bandwidth of the secondary component carrier is 50 RB and if the gap is greater than 10 MHz, but less than 45 MHz, the number of RB may be limited to 10.

if the channel bandwidth of the primary component carrier is 50 RB, if the channel bandwidth of the secondary component carrier is 25 RB and if the gap is greater than 15 MHz, but less than 50 MHz, a start point of the allocated resource block (RB) may be 33th RB.

According to the present disclosure, a lowering in reference sensitivity may be prevented.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

MODES FOR CARRYING OUT THE PREFERRED EMBODIMENTS

Figure 1:
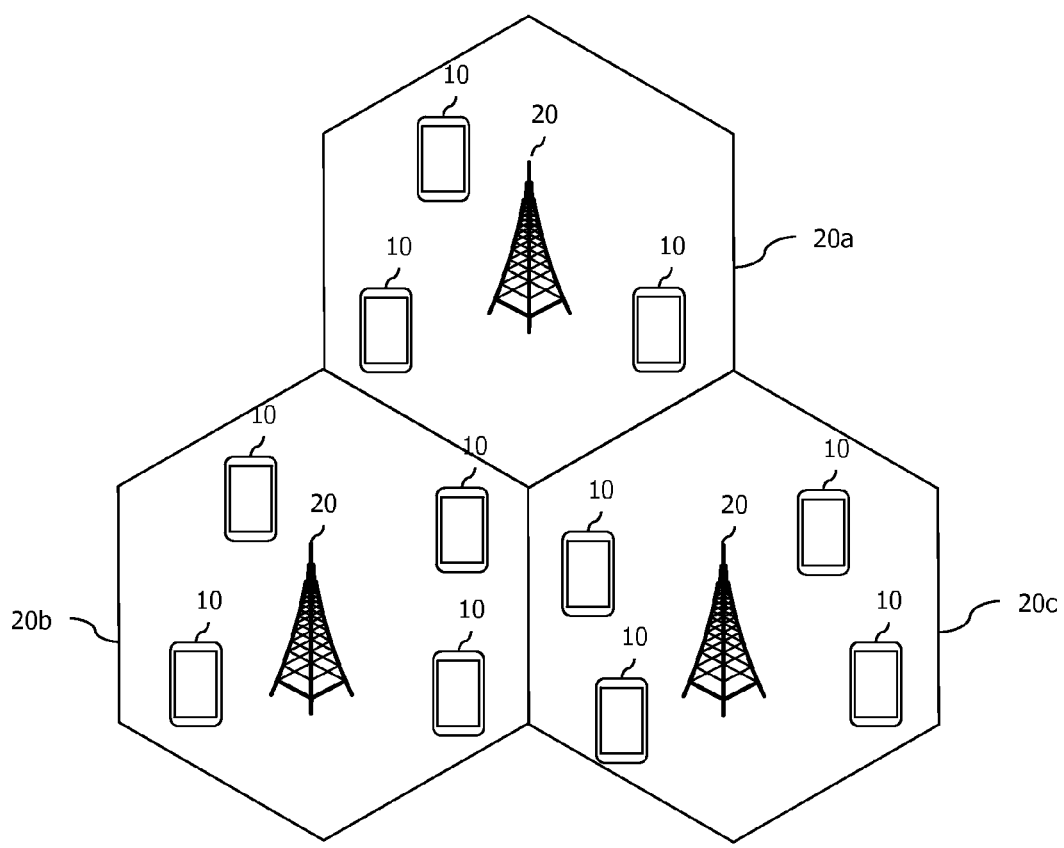
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Meanwhile, the LTE system defined by the 3GPP adopted such MIMO. Hereinafter, the LTE system is described in further detail.

Figure 2:
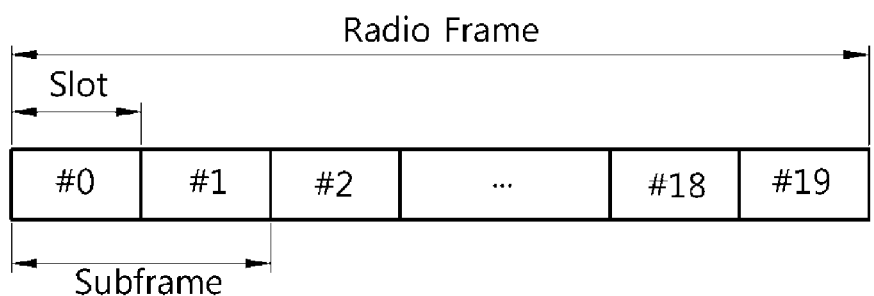
FIG. 2 illustrates the architecture of a radio frame according to FDD in 3GPP LTE.

FIG. 2 illustrates the architecture of a radio frame according to FDD in 3GPP LTE.

For the radio frame shown in FIG. 2, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, the radio frame consists of 10 sub-frames, and each sub-frame includes two slots. The slots in the radio frame are numbered with slot numbers 0 to 19. The time taken for one sub-frame to be transmitted is denoted TTI (transmission time interval). The TTI may be a scheduling unit for data transmission. For example, the length of one radio frame is 10 ms, the length of one sub-frame is 1 ms, and the length of one slot may be 0.5 ms.

The architecture of radio frame is merely an example, and the number of sub-frames in the radio frame or the number of slots in each sub-frame may be changed variously.

Meanwhile, one slot may include a plurality of OFDM symbols. How many OFDM symbols are included in one slot may vary depending on cyclic prefix (CP).

Figure 3:
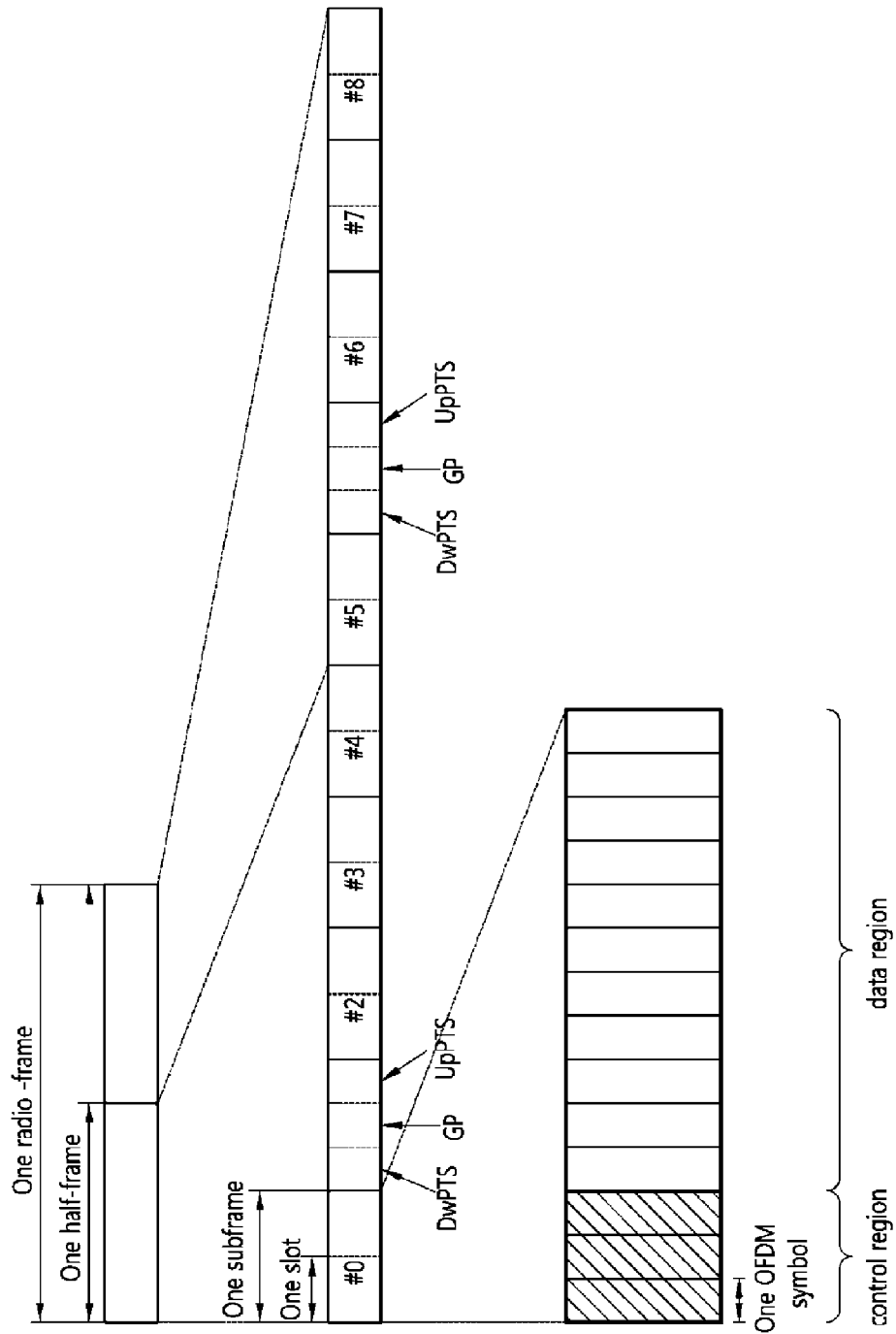
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Config-uraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 1-continued

| UL-DL Config-uraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'ID' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
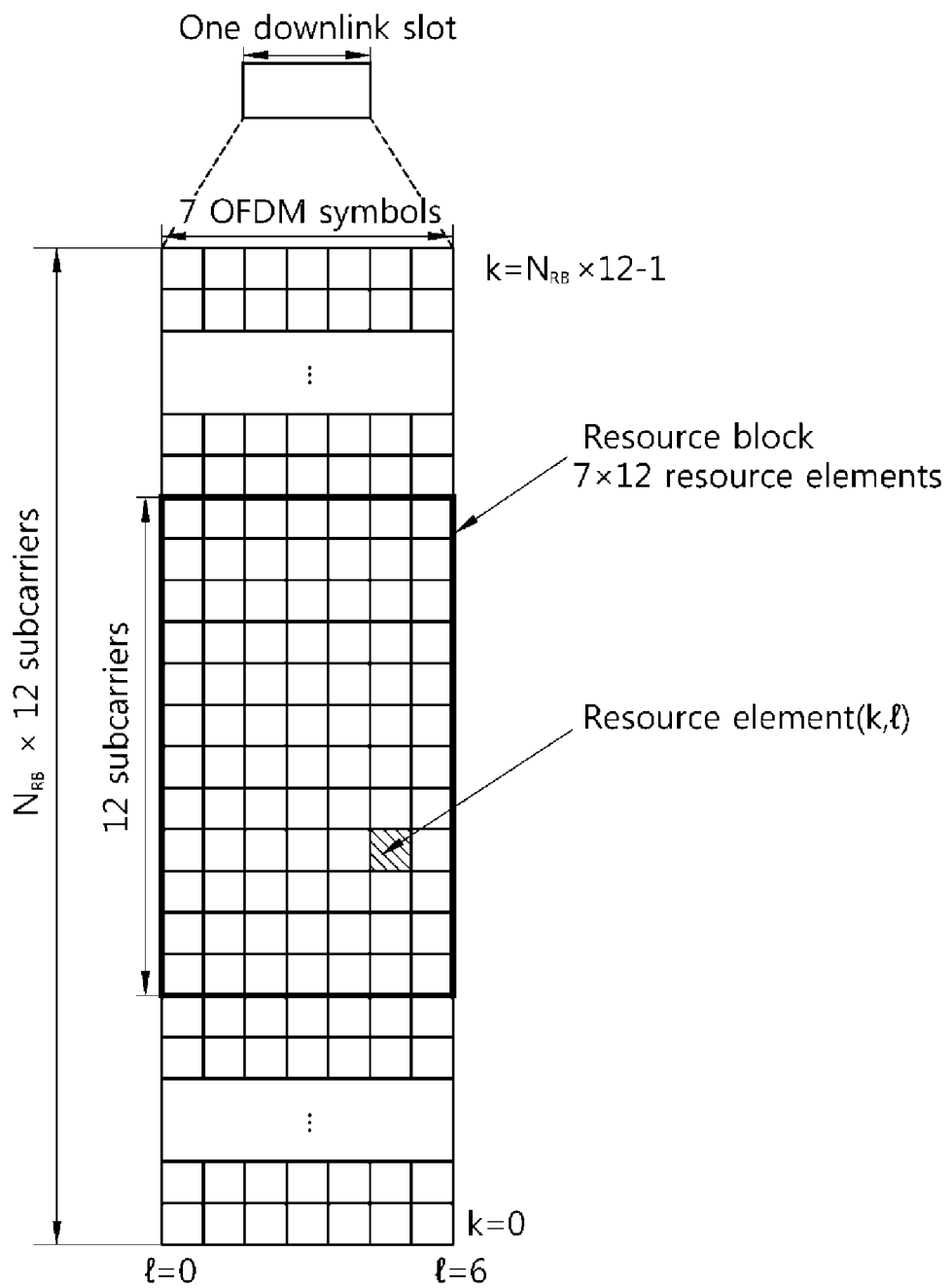
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period.

The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
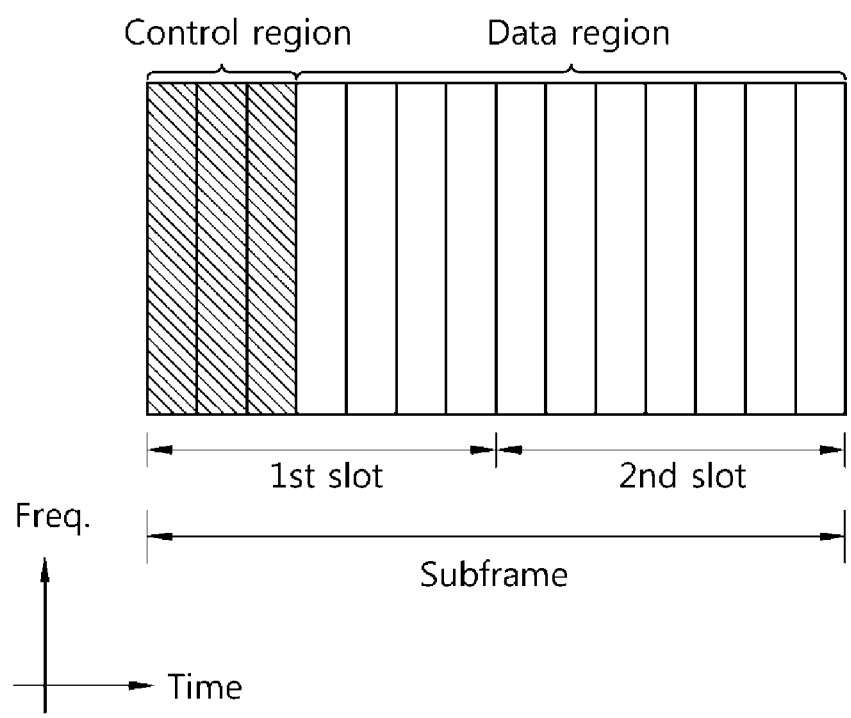
FIG. 5 illustrates the architecture of a downlink sub-frame.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
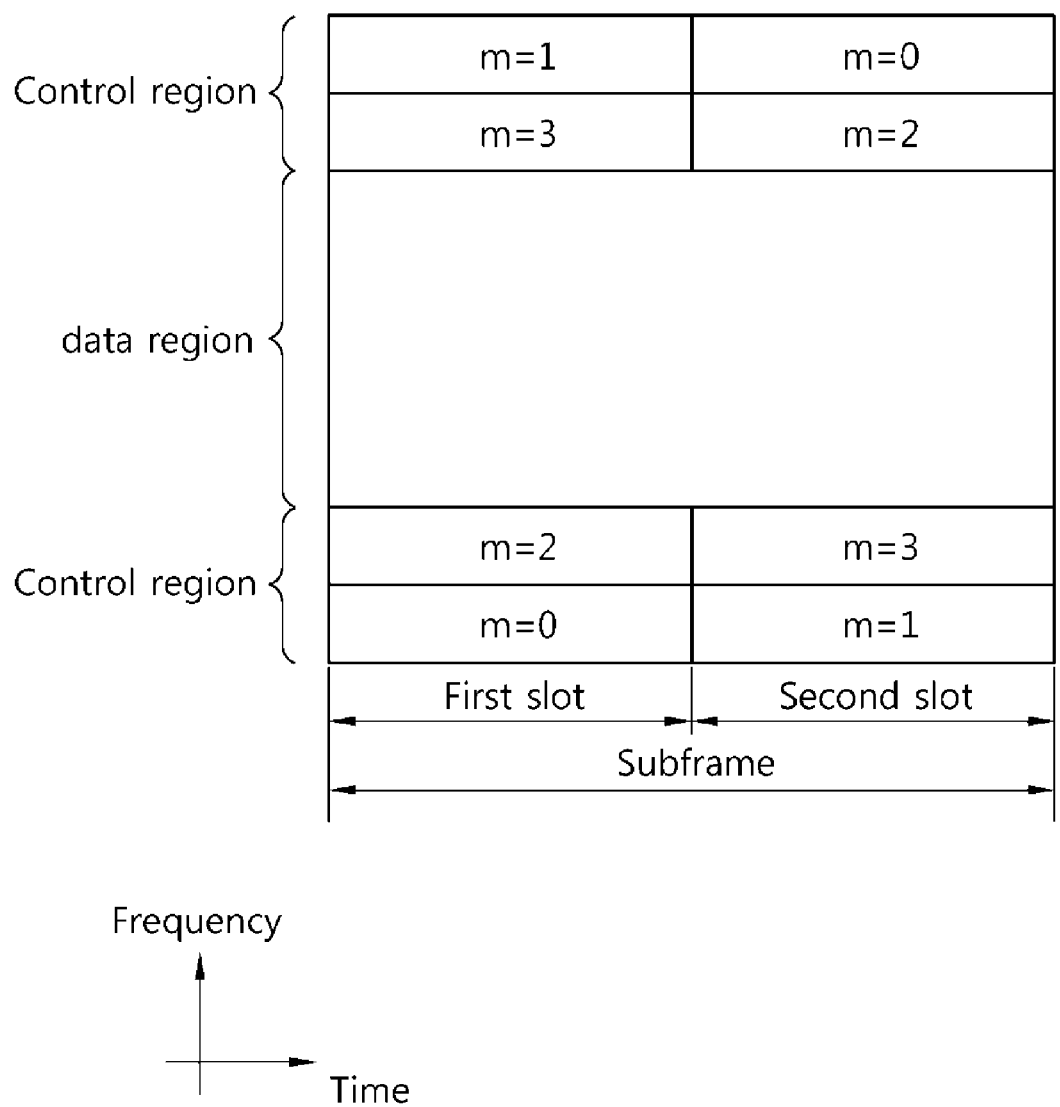
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame.

The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Meanwhile, an SC-FDMA transmission scheme is now described.

LTE (Long-Term Evolution) adopts, for uplink, SC (Single-Carrier) FDMA that is similar to OFDM (Orthogonal Frequency Division Multiplexing).

SC-FDMA may also be referred o as DFT-s OFDM (DFT-spread OFDM). In case the SC-FDMA transmission scheme is used, a non-linear distortion section of a power amplifier may be avoided, so that transmission power efficiency may be increased in a terminal with limited power consumption. Accordingly, user throughput may be increased.

SC-FDMA is similar to OFDM in that a signal is carried over split sub-carriers using FFT (Fast Fourier Transform) and IFFT (Inverse-FFT). However, an issue with the existing OFDM transmitter lies in that signals conveyed on respective sub-carriers on frequency axis are transformed into time-axis signals by IFFT. That is, in IFFT, the same operation is operated in parallel, resulting in an increase in PAPR (Peak to Average Power Ratio). In order to prevent such PAPR increase, SC-FDMA performs IFFT after DFT spreading unlike OFDM. That is, such transmission scheme that, after DFT spreading, IFFT is conducted is referred to as SC-FDMA. Accordingly, SC-FDMA is also referred to as DFT spread OFDM (DFT-s-OFDM) in the same meaning.

As such, advantages of SC-FDMA include providing robustness over a multi-path channel that comes from the fact that it has a similar structure to OFDM while fundamentally resolving the problem of OFDM that PAPR is increased by IFFT operation, thereby enabling effective use of a power amplifier.

Meanwhile, the 3GPP is devoting its energy to standardizing LTE-Advanced that is an evolutional version of LTE, and the clustered DFT-s-OFDM scheme has been adopted which permits non-contiguous resource allocation.

The clustered DFT-s OFDM transmission scheme is a variation of the existing SC-FDMA transmission scheme, and in this scheme, data symbols that have undergone a precoder are split into a plurality of sub-blocks that are mapped, separated from each other in the frequency domain.

Meanwhile, the LTE-A system is described in further detail.

A major feature of the clustered DFT-s-OFDM scheme is to enable frequency-selective resource allocation so as to flexibly deal with a frequency selective fading environment.

At this time, in the clustered DFT-s-OFDM scheme adopted as uplink access scheme in LTE-Advanced, unlike SC-FDMA that is a conventional LTE uplink access scheme, non-contiguous resource allocation is allowed, so that uplink data transmitted may be split into several cluster units.

That is, while the LTE system is configured to maintain the single carrier characteristic in the case of uplink, the LTE-A system permits DFTprecoded data to be assigned along the frequency axis in a non-contiguous way or both a PUSCH and a PUCCH to be transmitted at the same time. In such case, it is difficult to maintain the single carrier characteristic.

A carrier aggregation system is now described.

Figure 7:
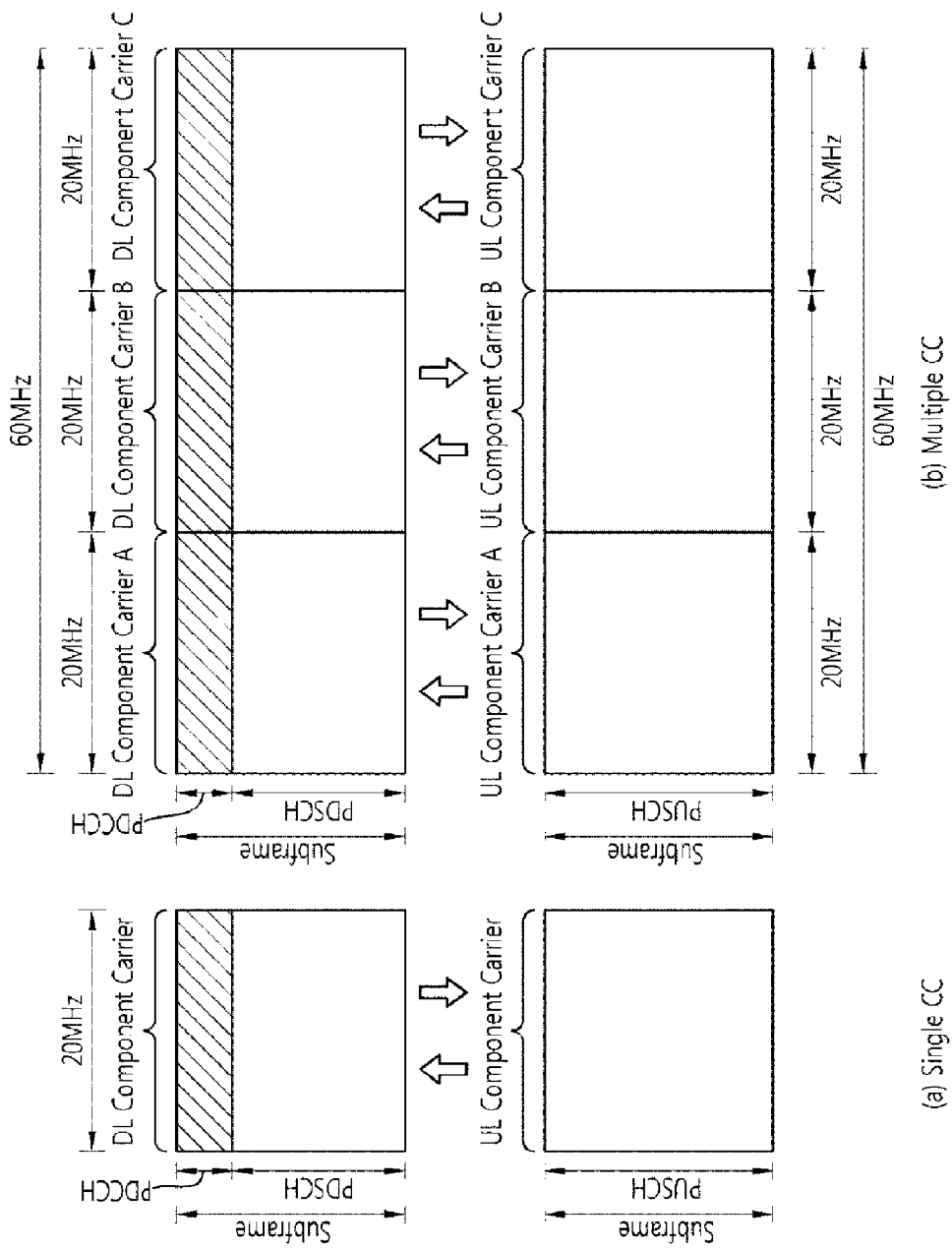
FIG. 7 illustrates an example of comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
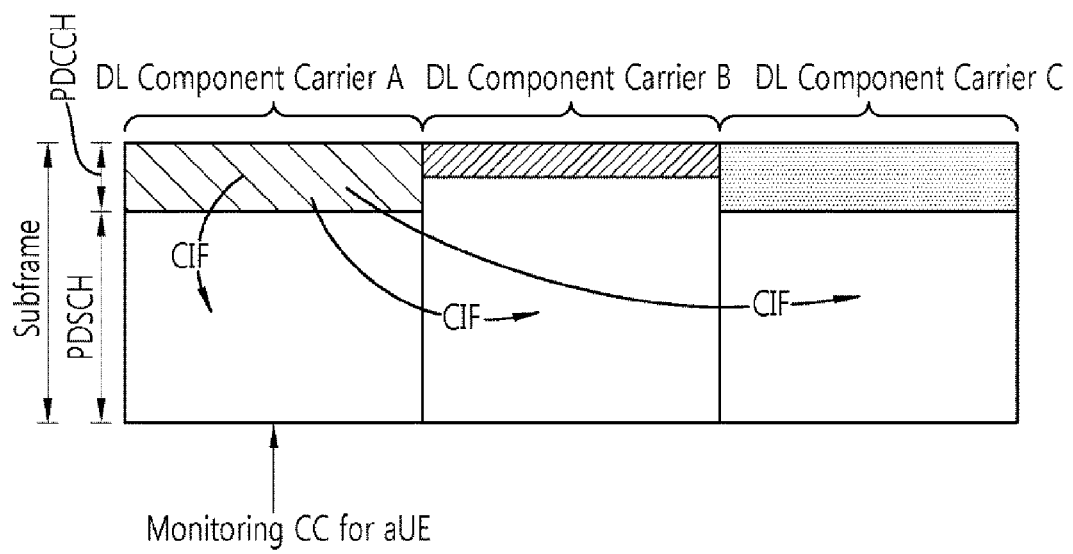
FIG. 8 illustrates an example of cross-carrier scheduling in a carrier aggregation system.

FIG. 8 illustrates an example of cross-carrier scheduling in a carrier aggregation system.

Referring to FIG. 8, the base station may configure a PDCCH monitoring DL CC (monitoring CC) set. The PDCCH monitoring DL CC set consists of some of all the aggregated DL CCs. If cross-carrier scheduling is configured, the terminal conducts PDCCH monitoring/decoding only on the DL CCs included in the PDCCH monitoring DL CC set. In other words, the base station transmits a PDCCH for PDSCH/PUSCH to be scheduled only through the DL CCs included in the PDCCH monitoring DL CC set. The PDCCH monitoring DL CC set may be configured terminal-specifically, terminal group-specifically, or cell-specifically.

In FIG. 8, three DL CCs (DL CC A, DL CC B, and DL CC C) are aggregated, and by way of example, DL CC A is set as the PDCCH monitoring DL CC set. The terminal may receive a DL grant for the PDSCH of DL CC A, DL CC B, and DL CC C through the PDCCH of DL CC A. The DCI transmitted through the PDCCH of DL CC A includes a CIF which allows it to be known which DL CC the DCI is for.

The CIF value is the same as the serving cell index value. The serving cell index is transmitted to the UE through an RRC signal. The serving cell index includes a value for identifying a serving cell, i.e., a first cell (primary cell) or a second cell (secondary cell). For example, 0 may represent a first cell (primary cell).

Figure 9:
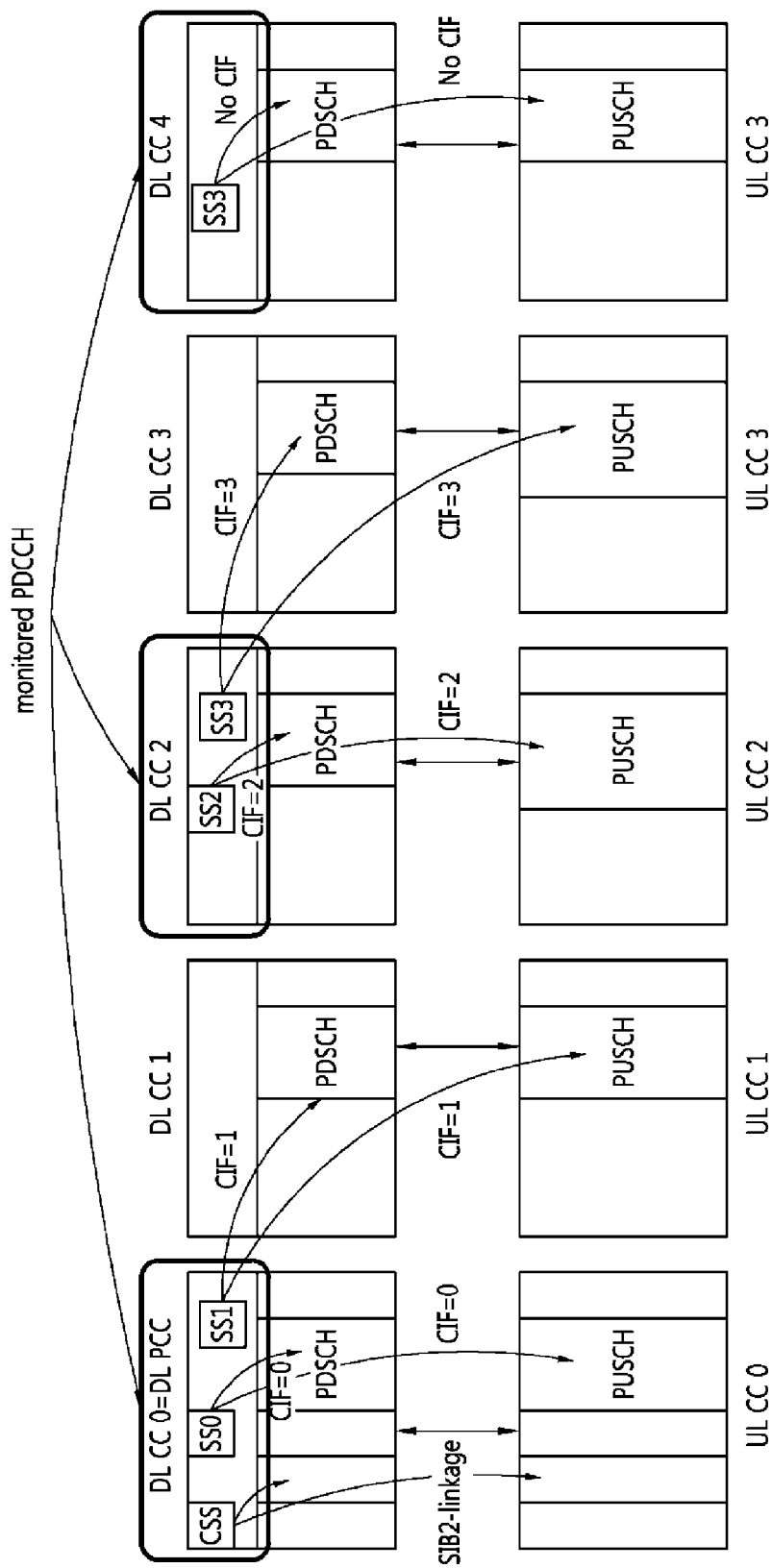
FIG. 9 illustrates example scheduling when cross-carrier scheduling is configured in a carrier aggregation system.

FIG. 9 illustrates example scheduling when cross-carrier scheduling is configured in a carrier aggregation system.

Referring to FIG. 9, DL CC 0, DL CC 2, and DL CC 4 are a PDCCH monitoring DL CC set. The terminal searches a DL grant/UL grant for DL CC 0, UL CC 0 (UL CC linked via SIB2 with DL CC 0) in the CSS of DL CC 0. In SS 1 of DL CC 0, a DL grant/UL grant for DL CC 1, UL CC 1 is searched. SS 1 is an example of the USS. That is, SS 1 of DL CC 0 is a search space for searching a DL grant/UL grant performing cross-carrier scheduling.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 10:
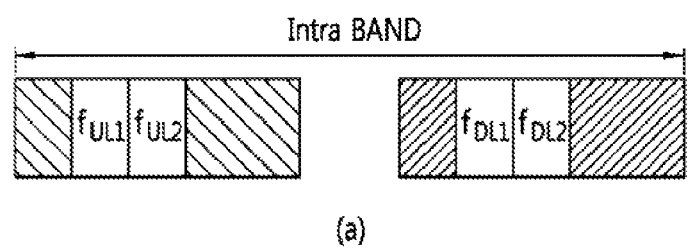
FIG. 10 is a concept view illustrating intra-band carrier aggregation (CA).
Figure 10:
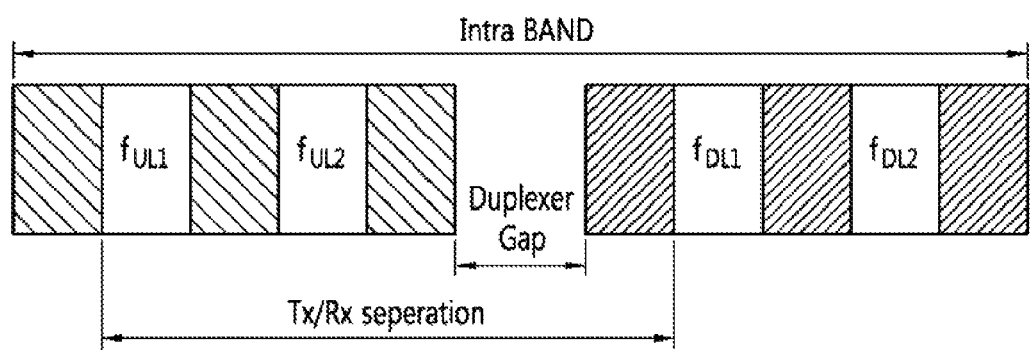

FIG. 10 is a concept view illustrating intra-band carrier aggregation (CA).

FIG. 10(a) illustrates intra-band contiguous CA, and FIG. 10(b) illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 10(a) and the intra-band non-contiguous CA shown in FIG. 10(b).

Figure 11:
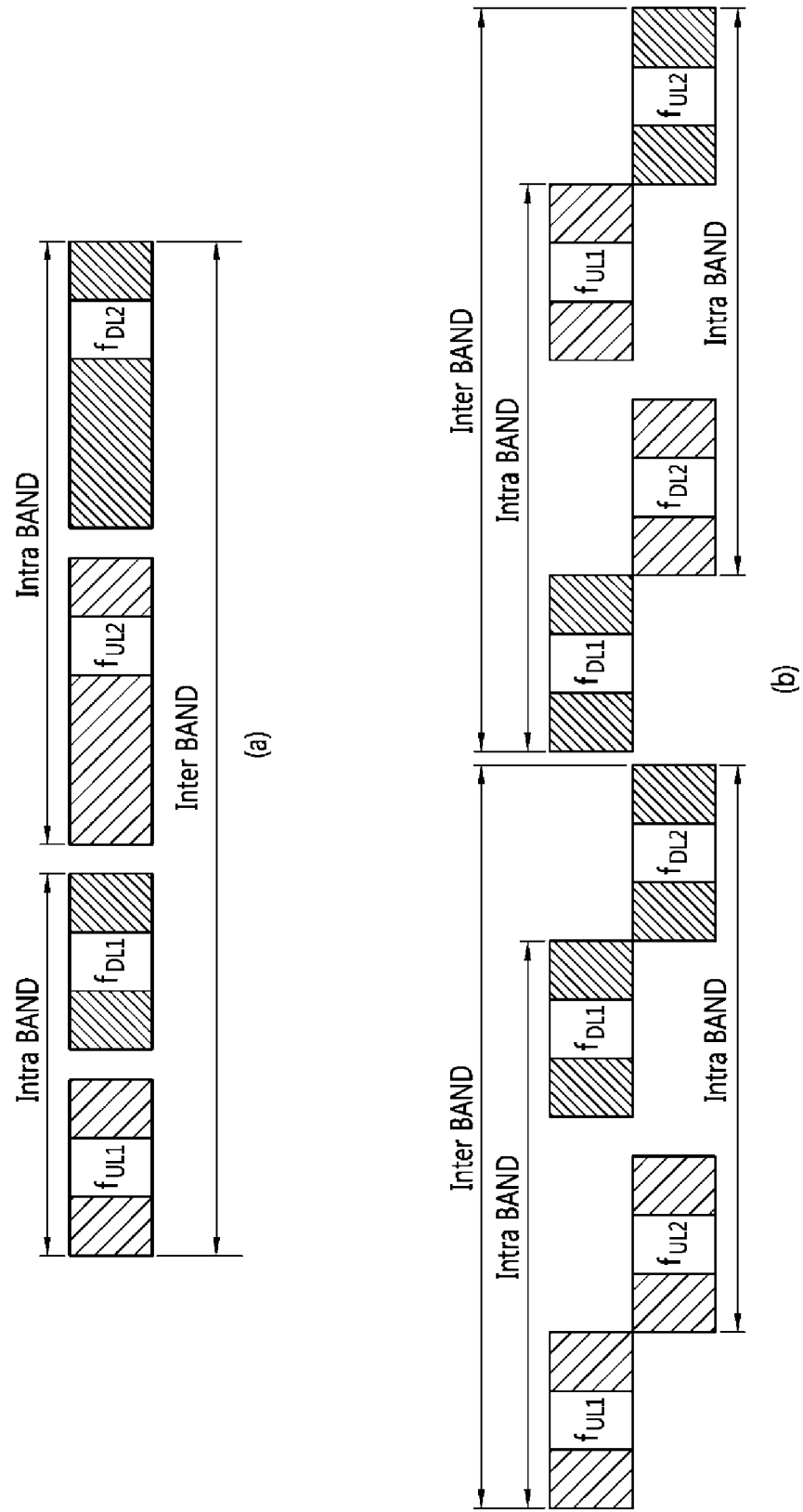
FIG. 11 is a concept view illustrating inter-band carrier aggregation.

FIG. 11 is a concept view illustrating inter-band carrier aggregation.

FIG. 11(a) illustrates a combination of a lower band and a higher band for inter-band CA, and FIG. 11(b) illustrates a combination of similar frequency bands for inter-band CA.

In other words, the inter-band carrier aggregation may be separated into inter-band CA between carriers of a low band and a high band having different RF characteristics of inter-band CA as shown in FIG. 11(a) and inter-band CA of similar frequencies that may use a common RF terminal per component carrier due to similar RF (radio frequency) characteristics as shown in FIG. 11(b).

TABLE 2

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 11 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
| --- | --- | --- | --- |
| A | $N_{RB, agg} \leq 100$ | 1 | $0.05\ BW_{Channel(1)}$ |
| B | $N_{RB, agg} \leq 100$ | 2 | FFS |
| C | $100 < N_{RB, agg} \leq 200$ | 2 | $0.05\ max(BW_{Channel(1)}, BW_{Channel(2)})$ |
| D | $200 < N_{RB, agg} \leq [300]$ | FFS | FFS |
| E | $[300] < N_{RB, agg} \leq [400]$ | FFS | FFS |
| F | $[400] < N_{RB, agg} \leq [500]$ | FFS | FFS |

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to CA configurations.

TABLE 4

| | E-UTRA CA configuration/Bandwidth combination set | | | | | |
| --- | --- | --- | --- | --- | --- | --- |
| E-UTRA CA configuration | 50 RB + 100 RB (10 MHz + 20 MHz) | 75 RB + 75 RB (15 MHz + 15 MHz) | 75 RB + 100 RB (15 MHz + 20 MHz) | 100 RB + 100 RB (20 MHz + 20 MHz) | Maximum aggregated bandwidth [MHz] | Bandwidth Combination Set |
| CA_1C | | Yes | | Yes | 40 | 0 |
| CA_7C | | Yes | | Yes | 40 | 0 |
| CA_38C | | Yes | | Yes | 40 | 0 |
| CA_40C | Yes | Yes | | Yes | 40 | 0 |
| CA_41C | Yes | Yes | Yes | Yes | 40 | 0 |

In the above table, CA configuration represents an operating bandwidth and CA bandwidth class. For example, CA_1C means operating band 2 in Table 2 and CA band class C in Table 3. All of the CA operating classes may apply to bands that are not shown in the above table.

Figure 12:
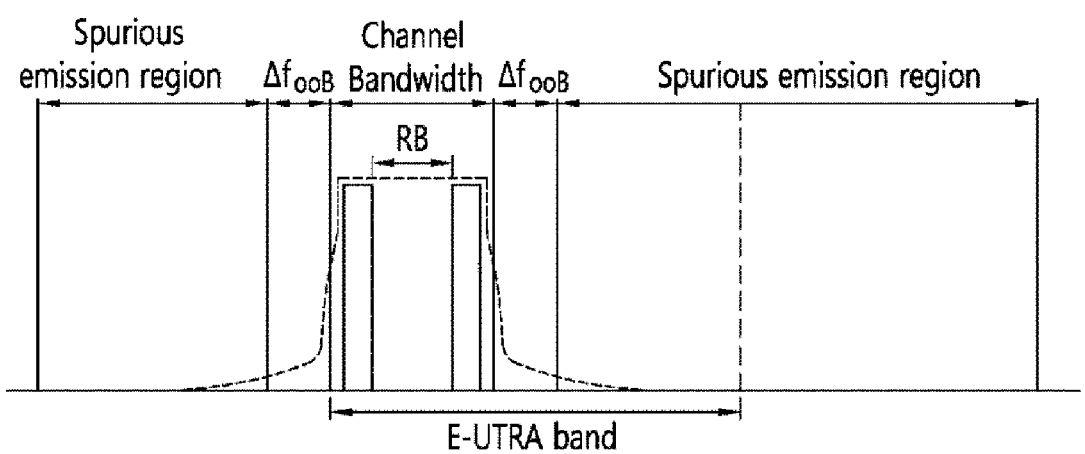
FIG. 12 illustrates the concept of unwanted emission.
Figure 13:
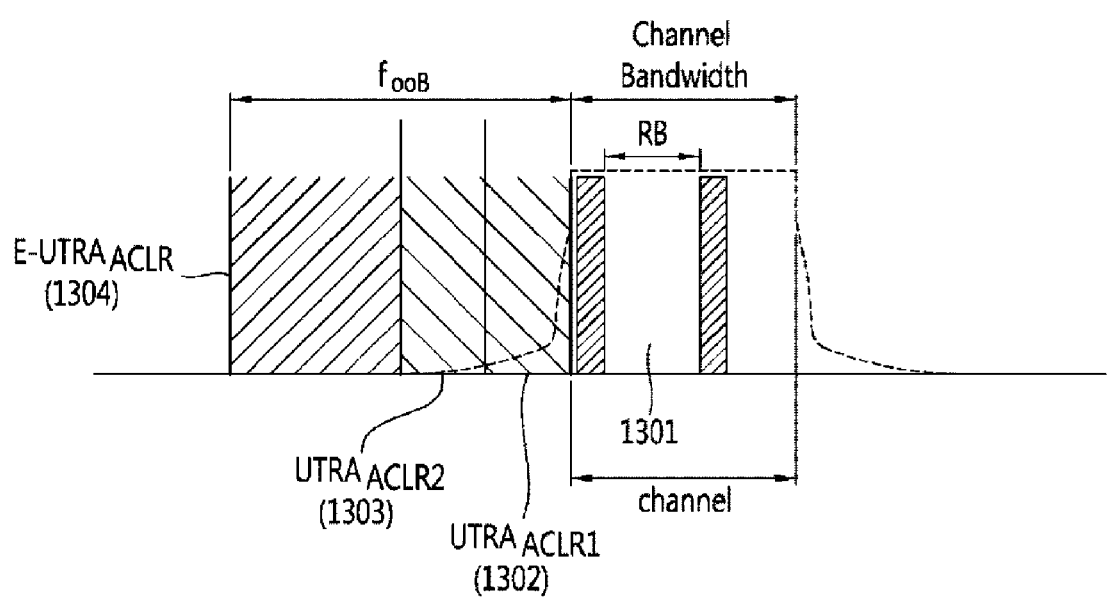
FIG. 13 specifically illustrates out-of-band emission of the unwanted emission shown in FIG. 12.
Figure 14:
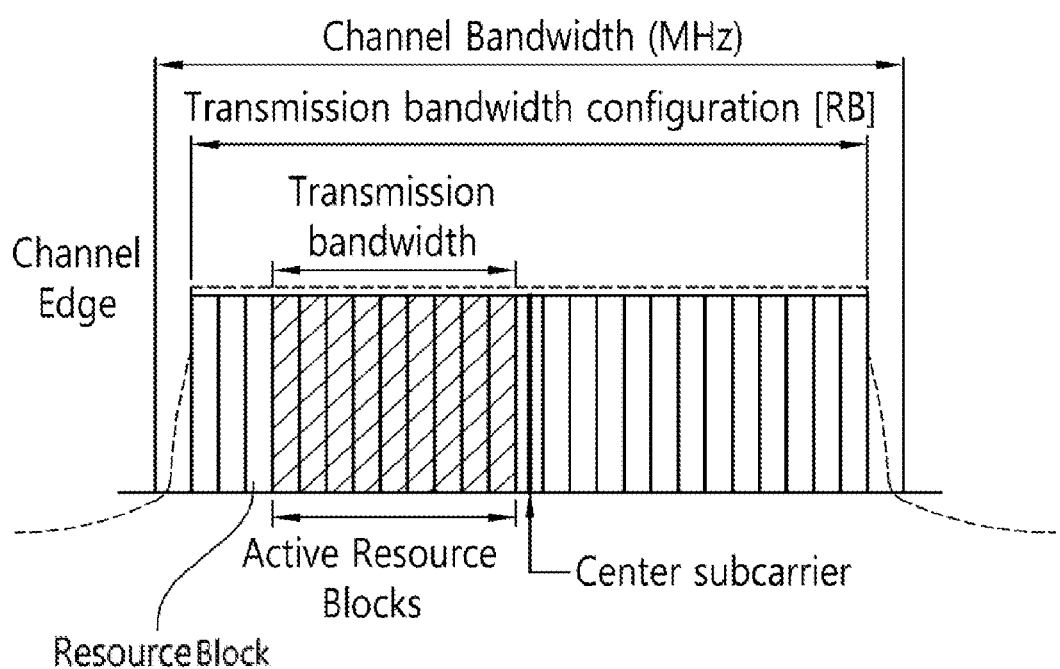
FIG. 14 illustrates a relationship between the resource block RB and channel band (MHz) shown in FIG. 12.

FIG. 12 illustrates the concept of unwanted emission. FIG. 13 specifically illustrates out-of-band emission of the unwanted emission shown in FIG. 12. FIG. 14 illustrates a relationship between the resource block RB and channel band (MHz) shown in FIG. 12.

As can be seen from FIG. 12, a transmission modem sends a signal over a channel bandwidth assigned in an E-UTRA band.

Here, the channel bandwidth is defined as can be seen from FIG. 14. That is, a transmission bandwidth is set to be smaller than the channel bandwidth ($BW_{Channel}$). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 5

| | Channel bandwidth $BW_{Channel}$ [MHz] | | | | | |
| --- | --- | --- | --- | --- | --- | --- |
| | 1.4 | 3 | 5 | 10 | 15 | 20 |
| Transmission bandwidth settings NRB | 6 | 15 | 25 | 50 | 75 | 100 |

Turning back to FIG. 12, unwanted emission arises in the band of $\Delta f_{OOB}$, and as shown, unwanted emission also occurs on the spurious area. Here, $\Delta f_{OOB}$ means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

In the meantime, as illustrated in FIG. 13, if transmission is conducted in the E-UTRA channel band 1301, leakage, i.e., unwanted emission, occurs to out-of-bands (1302, 1303, and 1304 in the shown $f_{OOB}$ area).

Here, $UTRA_{ACLR1}$ denotes a ratio of leakage to a channel 1302 to an E-UTRA channel 1301, i.e., an adjacent channel leakage ratio, in case the adjacent channel 1302 is the one for UTRA when a terminal conducts transmission on the E-UTRA channel 1301. $UTRA_{ACLR2}$ is a ratio of leakage to a channel 1303 (a UTRA channel) located to the adjacent channel 1302, i.e., an adjacent channel leakage ratio, in case the channel 1303 is the one for UTRA, as shown in FIG. 13. E-$UTRA_{ACLR}$ is a ratio of leakage to an adjacent channel 1304 (i.e., an E-UTRA channel) when the terminal conducts transmission through the E-UTRA channel 1301, i.e., an adjacent channel leakage ratio.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device.

Accordingly, the terminal's transmission power needs to be limited.

Figure 15:
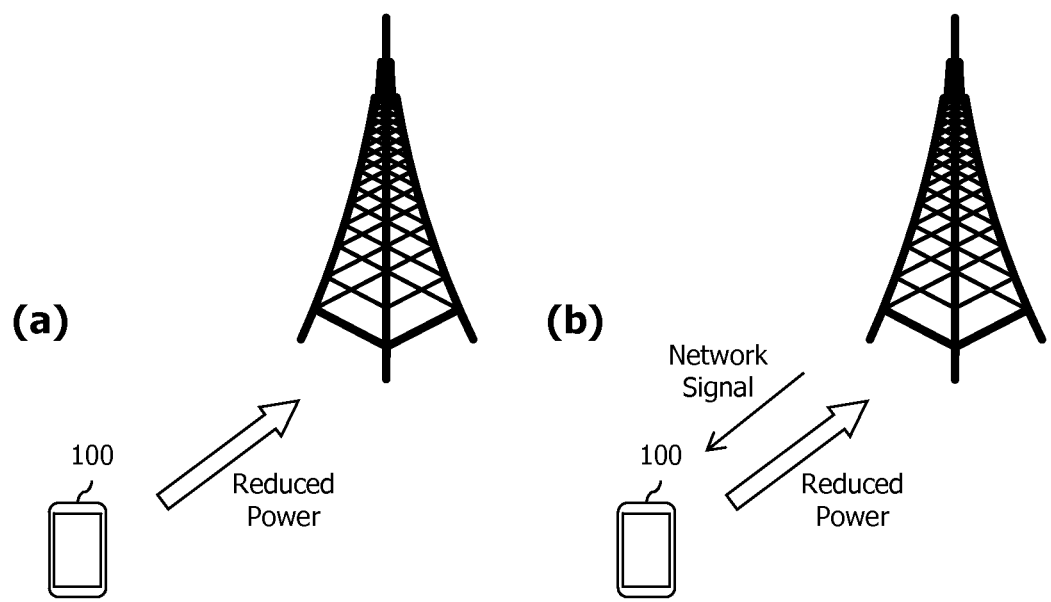
FIG. 15 illustrates an example of a method of limiting transmission power of a terminal

FIG. 15 illustrates an example of a method of limiting transmission power of a terminal.

As can be seen from FIG. 15(a), the terminal 100 conducts transmission with transmission power limited.

In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity. This is shown in the following table.

researched is used, an MPR value of a higher level may be needed. However, despite its advantage that it may reduce power consumption and heat radiation by 30% or more, the HEPA suffers from reduced cell coverage that comes from demand of a larger MPR value. Further, since linearity is guaranteed only up to 20 MHz to date, linearity is not insured considering carrier aggregation (CA).

<General MPR>

Taking the CA into account, the channel bandwidth of uplink, meanwhile, may be increased up to 40 MHz (20 MH+20 MHz), and accordingly, a larger MPR value is needed.

TABLE 7

| | CA bandwidth Class C | | | | MPR |
|---|---|---|---|---|---|
| Modulation | 50 RB + 100 RB | 75 RB + 75 RB | 75 RB + 100 RB | 100 RB + 100 RB | (dB) |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤18 | ≤1 |
| 16 QAM | >12 and ≤50 | >16 and ≤75 | > 16 and ≤75 | >18 and ≤100 | ≤2 |
| 16 QAM | >50 | >75 | >75 | >100 | ≤3 |

TABLE 6

| | Channel bandwidth/Transmission bandwidth (NRB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

Table 6 above represents MPR values for power classes 1 and 3.

<MPR Per 3GPP Release 11>

Meanwhile, according to 3GPP release 11, the terminal adopts multi-cluster transmission in a single CC (component carrier) and may simultaneously transmit a PUSCH and a PUCCH. As such, if the PUSCH and the PUCCH are transmitted at the same time, the size of the IM3 component (which means a distortion signal generated by intermodulation) that occurs at an out-of-band area may be increased as compared with the existing size, and this may serve as larger interference to an adjacent band. Thus, the following MPR value may be set so as to meet general spurious emission, ACLR (adjacent channel leakage ratio) and general SEM (spectrum emission mask) that are the terminal's emission requirements that should be observed by the terminal upon uplink transmission.

$$MPR=CEIL\{M_A, 0.5\}$$ [Equation 1]

Here, $M_A$ is as follows.
$M_A=[8.0]-[10.12]A; 0<A≤[0.33]$
$[5.67]-[3.07]A; [0.33]<A≤[0.77]$
$[3.31]; [0.77]<A≤[1.0]$ Here, A is as follows.
$A=N_{RB\_alloc}/N_{RB}$.

$N_{RB\_agg}$ is the number of RBs in the channel band, and $N_{RB\_alloc}$ is the total number of RBs that are transmitted at the same time.

$CEIL\{M_A, 0.5\}$ is a function that rounds off on a per-0.5 dB basis. That is, MPR∈[3.0, 3.5 4.0 4.5 5.0 5.5 6.0 6.5 7.0 7.5 8.0].

The MPR value shown in Equation 2 above is the one that applies when a general PA (power amplifier) is used. If a high efficiency power amplifier (HEPA) that is recently being Table 7 above represents MPR values for power class 3.

As in Table 7, in the case of class C of intra contiguous CA, an MPR value up to 3 dB may apply depending on modulation schemes. Meanwhile, under the environment of CA class C, the MPR value as follows should be met considering multi-cluster transmission.

$$MPR=CEIL\{M_A, 0.5\}$$ [Equation 2]

Here, $M_A$ is as follows.
MA=8.2; 0≤A<0.025
9.2−40A; 0.025≤A<0.05
8−16A; 0.05≤A<0.25
4.83−3.33A; 0.25≤A≤0.4,
3.83−0.83A; 0.4≤A≤1, As can be seen from FIG. 15(b), the base station may apply A-MPR (additional maximum power reduction) by transmitting a network signal (NS) to the terminal 100. The A-MPR, unlike the above-mentioned MPR, is that the base station transmits the network signal (NS) to the terminal 100 operating at a specific operating band so that the terminal 100 conducts additional power reduction in order not to affect adjacent bands, for example, not to give interference to the adjacent bands. That is, if a terminal applied with MPR receives a network signal (NS), A-MPR is additionally applied to determine transmission power.

The following table represents A-MPR values per network signal.

TABLE 8

| Network Signaling value | Channel bandwidth (MHz) | Resources Blocks (NRB) | A-MPR (dB) |
|---|---|---|---|
| NS_01 | 1.4, 3, 5, 10, 15, 20 | | Not defined |
| NS_03 | 3 | >5 | ≤1 |
| | 5 | >6 | ≤1 |
| | 10 | >6 | ≤1 |
| | 15 | >8 | ≤1 |
| | 20 | >10 | ≤1 |
| NS_04 | 5 | >6 | ≤1 |
| NS_05 | 10, 15, 20 | ≥50 | ≤1 |
| NS_06 | 1.4, 3, 5, 10 | — | Not defined |

TABLE 8-continued

| Network Signaling value | Channel bandwidth (MHz) | Resources Blocks (NRB) | A-MPR (dB) |
|---|---|---|---|
| NS_07 | 10 | Shown in Table 9 | |
| NS_08 | 10, 15 | >44 | ≤3 |
| NS_09 | 10, 15 | >40 | ≤1 |
| | | >55 | ≤2 |
| NS_18 | 5 | ≥2 | ≤1 |
| | 10, 15, 20 | ≤1 | ≤4 |

The following table represents A-MPR values when the network signal is NS_07.

TABLE 9

| Parameter | Region A | Region B | | Region C |
|---|---|---|---|---|
| $RB_{start}$ | 0-12 | 13-18 | 19-42 | 43-49 |
| $L_{CRB}$ [RBs] | 6-8 | 1-5, 9-50 | ≥8 | ≥18 | ≤2 |
| A-MPR [dB] | ≤8 | ≤12 | ≤12 | ≤6 | ≤3 |

In the above table, $RB_{start}$ indicates the lowest RB index of a transmission RB. $L_{CRB}$ indicates the length of consecutive RB allocations.

For example, in case the terminal provided with a service using a 10 MHz channel bandwidth receives NS_07 as a network signal, the terminal determines transmission power according to the above table and transmits the determined transmission power. In other words, in case the terminal instructs 5 RBs to be continuously sent from the $10^{th}$ RB that is a start point of the RBs when decoding a received uplink grant, the terminal may send the A-MPR value with up to 12 dB applied. Accordingly, the terminal's transmission power may apply alongside the equation for obtaining $P_{cmax}$ below. $P_{cmax}$ should satisfy the following conditions.

$$P_{CMAX\_L} \leq P_{CMAX} \leq P_{CMAX\_H} \quad \text{[Equation 3]}$$

Here, $P_{CMAX\_L}$ is obtained as follows.

$$P_{CMAX\_L} = \text{MIN}\{P_{EMAX} - T_C, P_{PowerClass} - \text{MAX}(\text{MPR} + A\text{-MPR}, P\text{-MPR}) - T_C\} \quad \text{[Equation 4]}$$

$P_{CMAX\_H}$ is obtained as follows.

$$P_{CMAX\_H} = \text{MIN}\{P_{EMAX}, P_{PowerClass}\} \quad \text{[Equation 5]}$$

$P_{EMAX}$ is given as P-Max through an RRC signal. $P_{PowerClass}$ represents the maximum UE power considering an allowable value. P-MPR is an allowable maximum power reduction. P-MPR may be obtained from the equation for yielding $P_{CMAX}$. $T_C$ may be 0 dB or 1.5 dB.

<A-MPR Per CA>

On the other hands, taking CA into consideration, the channel bandwidth of uplink may be increased up to 40 MHz (20 MHz+20 MHz), and accordingly, a larger MPR value is needed. Thus, in case the base station transmits a network signal to the terminal to protect a specific band in the CA environment, additional power reduction is conducted in the terminal operating at the specific band, thereby protecting adjacent bands.

The following table represents CA configurations corresponding to network signals.

TABLE 10

| Network signal | CA configuration |
|---|---|
| CA_NS_01 | CA_1C |
| CA_NS_02 | CA_1C |

TABLE 10-continued

| Network signal | CA configuration |
|---|---|
| CA_NS_03 | CA_1C |
| CA_NS_04 | CA_41C |
| CA_NS_05 | CA_38C |
| CA_NS_06 | CA_7C |

A-MPR for CS_NS_01 is summarized in detail in the following table.

TABLE 11

| Guard band | Frequency range (MHz) | Maximum level (dBm) | MBW (MHz) |
|---|---|---|---|
| E-UTRA band 34 | $F_{DL\_low}$-$F_{DL\_high}$ | −50 | 1 |
| Frequency range | 1884.5-1915.7 | −41 | 0.3 |

A-MPR for CS_NS_02 is summarized in detail in the following table.

TABLE 12

| Guard band | Frequency range (MHz) | Maximum level (dBm) | MBW (MHz) |
|---|---|---|---|
| E-UTRA band 34 | $F_{DL\_low}$-$F_{DL\_high}$ | −50 | 1 |
| Frequency range | 1900-1915 | −15.5 | 5 |
| Frequency range | 1915-1920 | +1.6 | 5 |

A-MPR for CS_NS_03 is summarized in detail in the following table.

TABLE 13

| Guard band | Frequency range (MHz) | Maximum level (dBm) | MBW (MHz) |
|---|---|---|---|
| E-UTRA band 34 | $F_{DL\_low}$-$F_{DL\_high}$ | −50 | 1 |
| Frequency range | 1880-1895 | −40 | 1 |
| Frequency range | 1895-1915 | −15.5 | 5 |
| Frequency range | 1915-1920 | +1.6 | 5 |

Meanwhile, reference signal (REFSENS) is hereinafter described.

The reference sensitivity (REFSENS) refers to a maximum use sensitivity for a value that specifies, e.g., a signal to noise ratio (SNR), a receiver bandwidth, degree of modulation, and impedance of a signal source among reception sensitivities. Here, the reception sensitivities may be receiver input voltages for obtaining a specified output.

In the LTE mobile communication system, when an uplink and a downlink are simultaneously configured over the same sub-frame, interference leakage may occur between the terminal's uplink RF chain and downlink RF chain. This means that an unwanted transmission signal leaks to the reception end. This is called secondary inter-modulation component (or inter-modulation product), i.e., IM2 component. Among the IM components, some component drops the reception performance substantially to the reference sensitivity.

Figure 16:
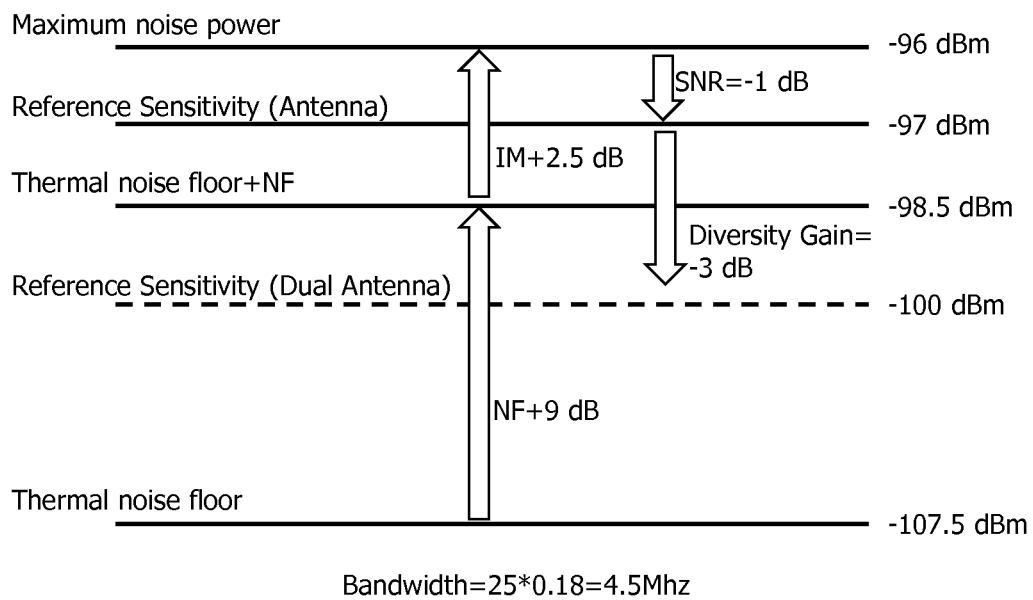
FIG. 16 illustrates an example of reference sensitivity.

FIG. 16 illustrates an example of reference sensitivity.

Referring to FIG. 16, example reference sensitivity (REFSENS) is shown for the case where QPSK modulation is used in the LTE 5 MHz band.

The reference sensitivity (REFSENS) may be determined by the following equation as shown in FIG. 16.

$$\text{REFSENS} = kTB + 10 \log(\text{CH\_BW}) + NF + IM + SINR - 3 + D_{FB} \text{ (dBm)} \quad \text{[Equation 6]}$$

Here, kTB=−174 dBm/Hz, and NF=9 for UE (5 for BS).
'−3' means a diversity gain of the receiver.

$D_{FB}$ is an additional mitigation reflecting a variation in design of a device such as a duplexer. SINR is −1 for low SNR (QPSK, R=⅓). IM=2.5.

In the LTE system, assuming a 5 MH channel, as illustrated, the effective channel that may actually conduct RB allocation is 4.5 MHz, and a reference sensitivity level (REFSENS) reflecting this is determined as follows.

$$REFSENS = kTB + 10\log(CH\_BW) + NF + IM + SINR - 3 + D_{FB} \text{ (dBm)} = -174 + 66.5 + 9 + 2.5 - 1 - 3 + 0 \quad \text{[Equation 7]}$$

The theoretical levels of reference sensitivity (REFSENS) obtained so may be summarized in the following table taking into consideration the gap between the uplink band and downlink band of the channel, a pass bandwidth, and characteristics of the duplex filter. That is, In case the gap between downlink and uplink is broad while the pass band is small like band 1 and band 4, the characteristics of general filters are followed, and in such case, there is no influence that is likely to decrease a reduction in reception. However, in case the gap between the uplink band and the downlink band is 20 MHz while the pass band is broad, e.g., 75 MHz, like band 3, $D_{FB}$=3 dB is reflected to the existing reception sensitivity thereby ending up with −97 dBm.

The following table represents reference sensitivities when using QPSK modulation.

TABLE 14

| E-UTRA band | 1.4 MHz (dBm) | 3 MHz (dBm) | 5 MHz (dBm) | 10 MHz (dBm) | 15 MHz (dBm) | 20 MHz (dBm) | Duplex Mode |
|---|---|---|---|---|---|---|---|
| 1 | | | −100 | −97 | −95.2 | −94 | FDD |
| 3 | −101.7 | −98.7 | −97 | −94 | −92.2 | −91 | FDD |
| 4 | −104.7 | −101.7 | −100 | −97 | −95.2 | −94 | FDD |
| 12 | −101.7 | −98.7 | −97 | −94 | | | FDD |

The following table represents reference sensitivities in the CA environment when using QPSK modulation.

TABLE 15

| EUTRA CA configuration | EUTRA band | 1.4 MHz (dBm) | 3 MHz (dBm) | 5 MHz (dBm) | 10 MHz (dBm) | 15 MHz (dBm) | 20 MHz (dBm) | Duplex mode |
|---|---|---|---|---|---|---|---|---|
| CA_3A-8A | 3 | | | | Not defined | Not defined | Not defined | FDD |
| | 8 | | | Not defined | Not defined | | | |
| CA_4A-12A | 4 | [−89.2] | [−89.2] | [−90] | [−89.5] | | | FDD |
| | 12 | | | −96.5 | −93.5 | | | |
| CA_4A-17A | 4 | | | [−90] | [−89.5] | | | FDD |
| | 17 | | | −96.5 | −93.5 | | | |

In the above table, since band 8 does not completely overlap in practice, a test is performed only at the area without no overlap using an RB limitation, and in such case, the existing band-3 requirement is observed. However, upon overlapping, the reference sensitivity test is not carried out.

Meanwhile, in the case of a multi-mode multi-RAT (radio access technology) terminal using a quadplexer obtained by combining a duplexer and a diplexer and a filter for removing harmonic components, a loss due to DFB is added, so that the terminal's reception sensitivity is slightly mitigated.

Figure 17A:
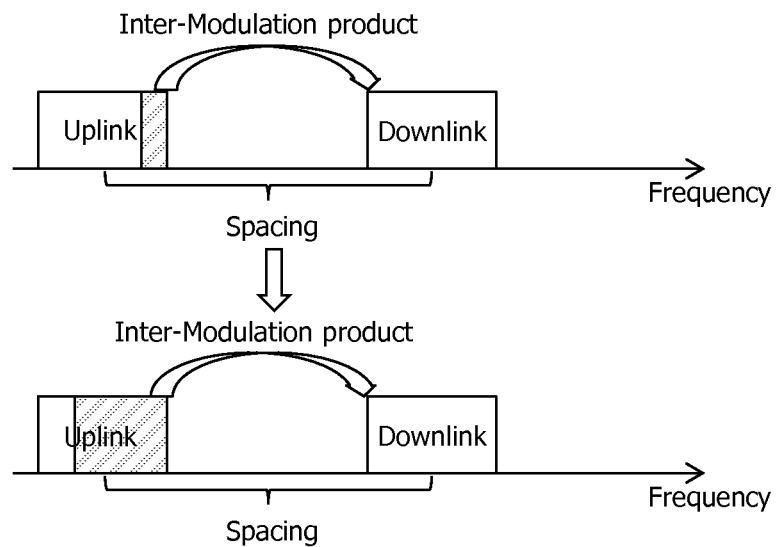
FIG. 17A illustrates an example simulation environment of general reception sensitivity.
Figure 17B:
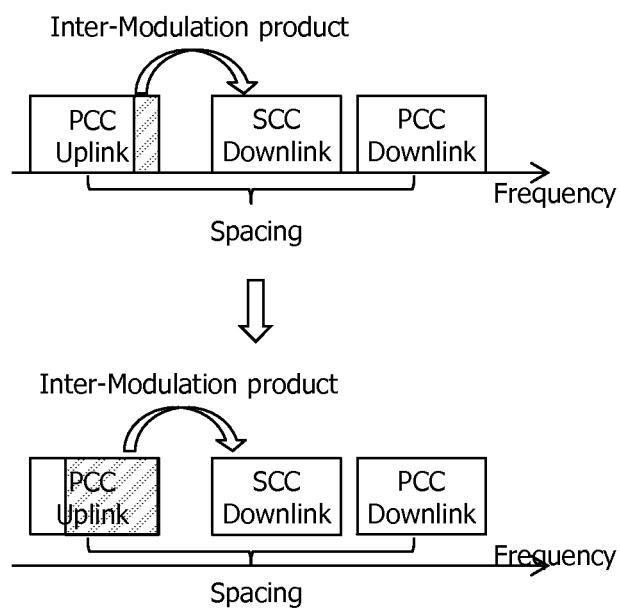
FIG. 17B illustrates an example simulation environment of reception sensitivity when intra-band non-contiguous CA is configured according to this disclosure.

FIG. 17A illustrates an example simulation environment of general reception sensitivity, and FIG. 17B illustrates an example simulation environment of reception sensitivity when intra-band non-contiguous CA is configured according to this disclosure.

Referring to FIG. 17A, a general simulation environment where no CA is configured is shown. Under such environment, it can be observed how much the reference sensitivity is lowered on downlink by an inter-modulation component when increasing the uplink allocation by 1 RB starting from where is closest to the downlink band.

On the other hand, referring to FIG. 17B, a simulation environment for the case where intra-band non-contiguous CA is configured according to the present disclosure is shown. As such, a test was performed to observe how much reference sensitivity is decreased on downlink of a secondary component carrier (SCC) by an inter-modulation component when increasing the resource allocation on uplink of the primary component carrier (PCC) by 1 RB starting from where is closest to the downlink band of the secondary component carrier (SCC). In such CA environment, interference caused by uplink transmission may degrade the reference sensitivity.

Basic RF simulation assumption and parameters are described below.

transmission and reception architecture: single PA (Power Amplifier), two reception antennas (main+diversity)
channel bandwidth (PCC+SCC): 5 MHz+5 MHz, 5 MHz+10 MHz, 10 MHz+5 MHz and 10 MHz+10 MHz
sub-block gap between PCC and SCC (Gap): 0~55 MHz
Modulator impairments are as follows.
I/Q imbalance: 25 dBc
Carrier leakage: 25 dBc
Counter IM3: 60 dBc Here, I/Q imbalance means serving as a diffusion between symmetrical sub-carriers to deteriorate performance. At this time, unit dBc represents a size relative to the power magnitude of a carrier frequency. Carrier leakage is an additional sine wave form having the same frequency as the frequency of a modulation carrier. Counter IM3 (counter modulation distortion) represents an element that is induced by a component such as a mixer or amplifier in an RF system.

PA operating point: Pout=22 dBm (in case QPSK is used and 100 RB is wholly assigned)
Duplexer attenuation: 50 dB
Insertion loss: 3 dB
Noise Floor: −140 dBm/Hz at the PA output Turning back to FIG. 17B, when intra-band non-contiguous CA is configured, simulation was carried out to see how much reference sensitivity is lowered on downlink of the secondary component carrier (SCC) by an inter-modulation component when increasing uplink resource allocation by 1 RB starting from where is closest to the downlink band of the secondary component carrier (SCC) under the environment where one uplink signal is transmitted and is received simultaneously at two downlink bands, and results of the simulation were shown in FIGS. 18 to 23.

That is, the simulation according to the present disclosure is primarily aimed to identify how many the number of RBs should be limited in order to prevent the reference sensitivity from being lowered significantly and whether the starting point of an RB needs to be restricted.

Figure 18A:
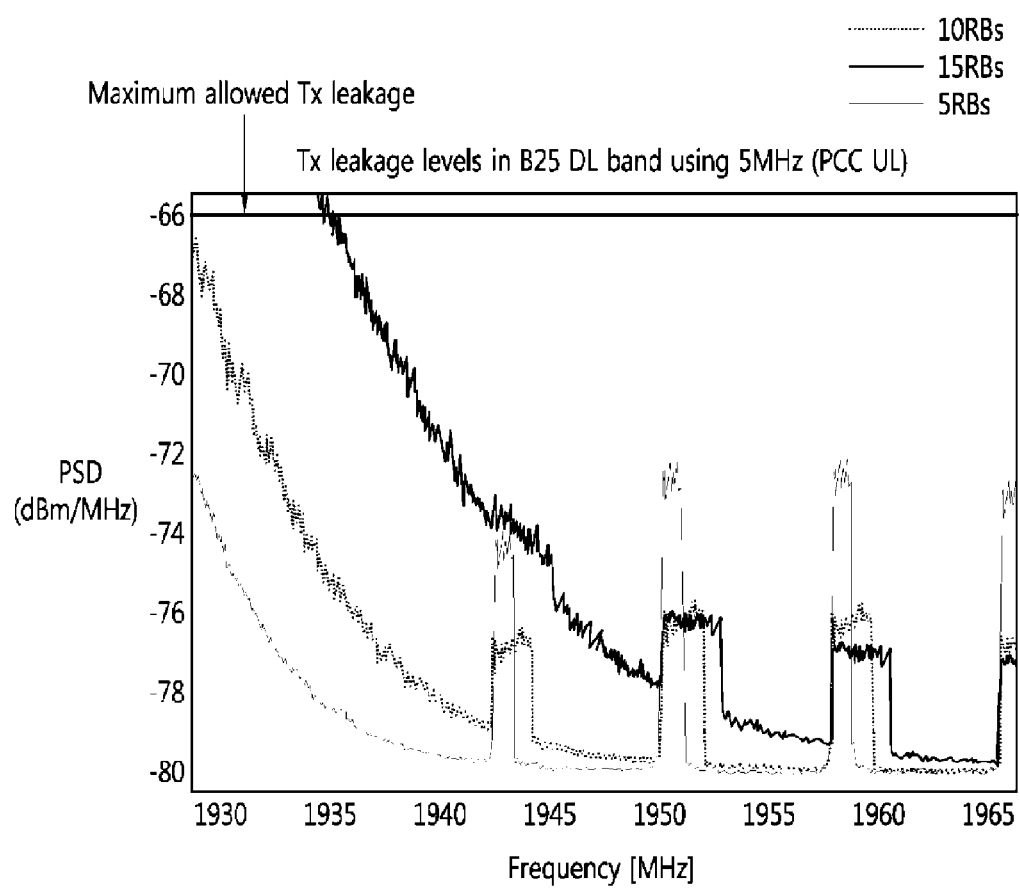
FIGS. 18A and 18B illustrate results of simulation about the power level of a transmission signal that flows in at a reception frequency of band 25 when intra-band non-contiguous CA is configured according to this disclosure.
Figure 18B:
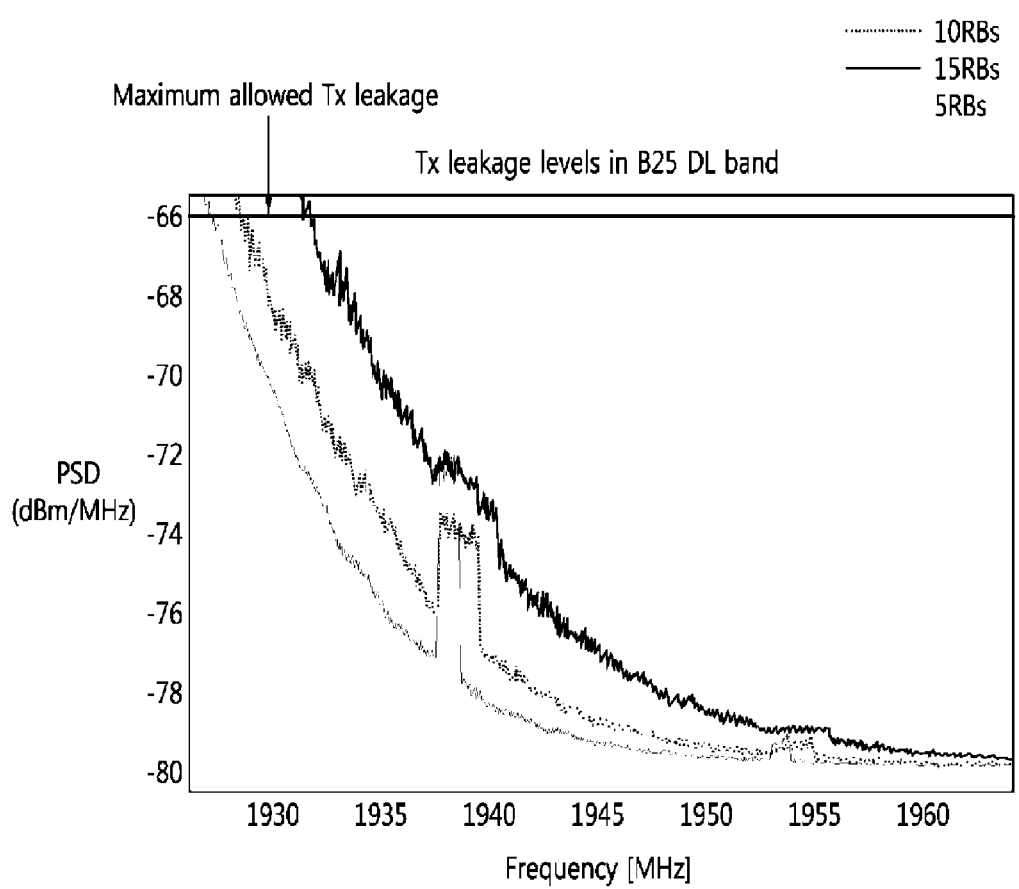

FIGS. 18A and 18B illustrate results of simulation about the power level of a transmission signal that flows in at a reception frequency of band 25 when intra-band non-contiguous CA is configured according to this disclosure.

Referring to FIG. 18A, in case a channel bandwidth of 5 MHz is used by a primary component carrier at operating band 25 of Table 2, the transmission leakage level is shown in PDS (Power Spectrum Density) when the resource allocation of uplink increases to 5 RB, 10 RB, and 15 RB. Referring to FIG. 18B, the transmission leakage level is shown in PDS when the resource allocation of uplink is increased to 5 RB, 10 RB, and 15 RB at operating band 25 of Table 2.

In general, in order to keep the reference sensitivity at the reception end identical to that offered in Rel-8/9, even in the intra-band non-contiguous CA, a signal level of the transmission end of the terminal comes through the duplexer to the reception end, and thus, the signal level at the transmission end needs to be restricted. In order to maintain −100 dBm at the intra-band non-contiguous CA 5 MHz channel, the maximum allowable leakage level at the inflow transmission end is about −66 dBm, and when applying the attenuation level, 50 dB, of the duplexer, is calculated as follows.

$$REFSENS \text{ for operating band} = \text{Conventional } REFSENS +$$

$$\text{Tx\_leakage levels(with Duplexer attenuation)} =$$

$$-100 \text{ dBm/CH\_BW} + -116(-66 - 50) \text{ dBm/MHz} =$$

$$-107 \text{ dBm/MHz} + -116 \text{ dBm/MHz} =$$

$$-106.49 \text{ dBm/MHz} = -96.49 \text{ dBm/CH\_BW} \cong -97 \text{ dBm}$$

FIGS. 18A and 18B represent restricted levels using this. In case only one PCC is used as uplink in FIGS. 18A and 18B, if the uplink resource is assigned with 15 RB, the reference sensitivity requirements for band 25 cannot be met. Accordingly, in case intra-band non-contiguous CA is configured, it is preferable to reduce the uplink resource allocation to 5 RB or 10 RB in the primary component carrier. Here, the purse component in the FIGS. 18A and 18B is a phenomenon that occurs due to amplification of a signal generated by unnecessary components prior to the terminal passing the PA, but this is a level unrelated to analysis for limiting the actual number of RB allocations. That is, another 50 dB is cut by attenuation of the duplexer at the reception end, so that the value is ignored by the noise components.

Meanwhile, results of additionally simulating whether the reference sensitivity requirements for band 25 may be satisfied by shifting where the RB is located are shown in FIGS. 19A to 19D.

FIGS. 19A to 19D illustrate desensitization levels for reception sensitivity when varying the RB location of an uplink resource allocation in case intra-band non-contiguous CA is configured according to the present disclosure.

Figure 19A:
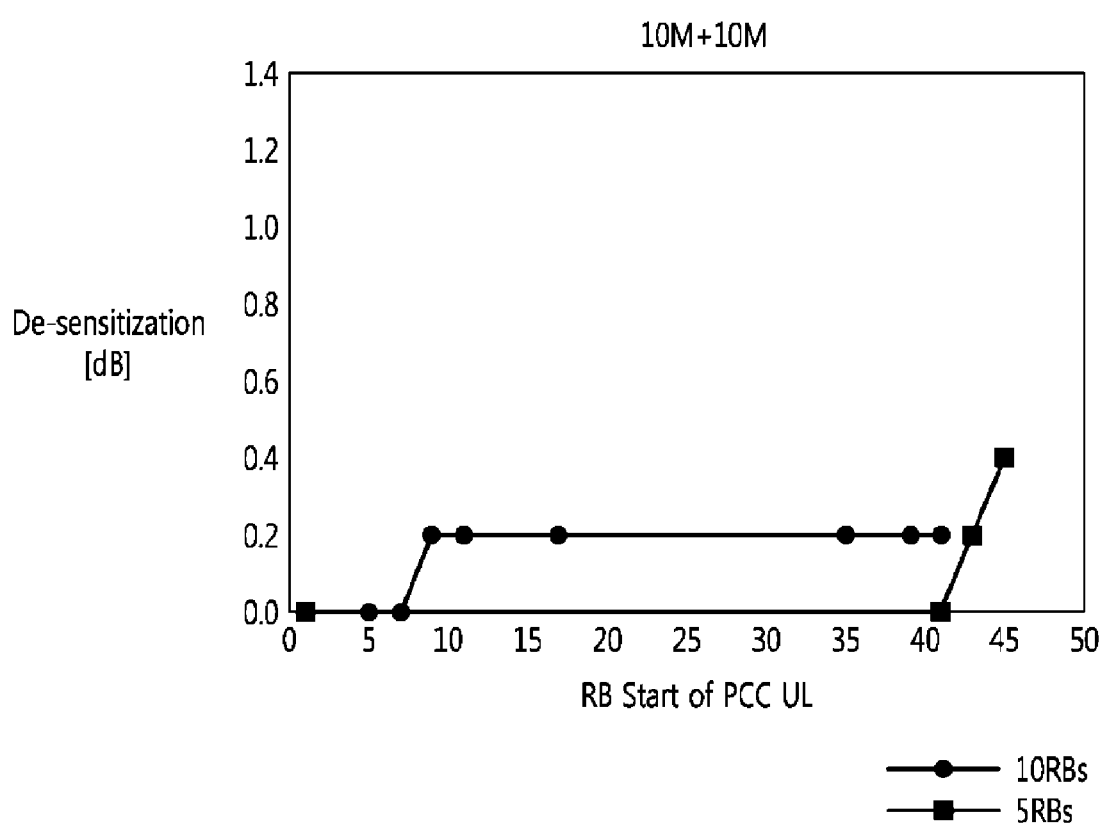
FIGS. 19A to 19D illustrate desensitization levels for reception sensitivity when varying the RB location of an uplink resource allocation in case intra-band non-contiguous CA is configured according to the present disclosure.

FIG. 19A illustrates desensitization levels for reception sensitivity when shifting the start point of an RB, with the resource allocation of uplink set as 5 RB or 10 RB in case the channel bandwidth of a primary component carrier (PCC) is 10 MHz (i.e., 50 RB) and the channel bandwidth of a secondary component carrier (SCC) is also 10 MHz (i.e., 50 RB). Table 16 represents in detail the result of FIG. 19B.

TABLE 16

| $\Delta F_{block}$ | SCC center frequency(Fc) | UL RB count | Start point of RB | Reception sensitivity | Desensitization level |
|---|---|---|---|---|---|
| 45 | 1935 | 10 | 1 | −93.5 | 0.0 |
| 45 | 1935 | 10 | 5 | −93.5 | 0.0 |
| 45 | 1935 | 10 | 7 | −93.5 | 0.0 |
| 45 | 1935 | 10 | 9 | −93.3 | 0.2 |
| 45 | 1935 | 10 | 11 | −93.3 | 0.2 |
| 45 | 1935 | 10 | 17 | −93.3 | 0.2 |
| 45 | 1935 | 10 | 35 | −93.3 | 0.2 |
| 45 | 1935 | 10 | 39 | −93.3 | 0.2 |
| 45 | 1935 | 10 | 41 | −93.3 | 0.2 |
| 45 | 1935 | 5 | 15 | −93.5 | 0.0 |
| 45 | 1935 | 5 | 1 | −93.5 | 0.0 |
| 45 | 1935 | 5 | 41 | −93.5 | 0.0 |
| 45 | 1935 | 5 | 43 | −93.3 | 0.2 |
| 45 | 1935 | 5 | 45 | −93.1 | 0.4 |

In the above table, ΔFblock means a gap between sub-blocks.

Figure 19B:
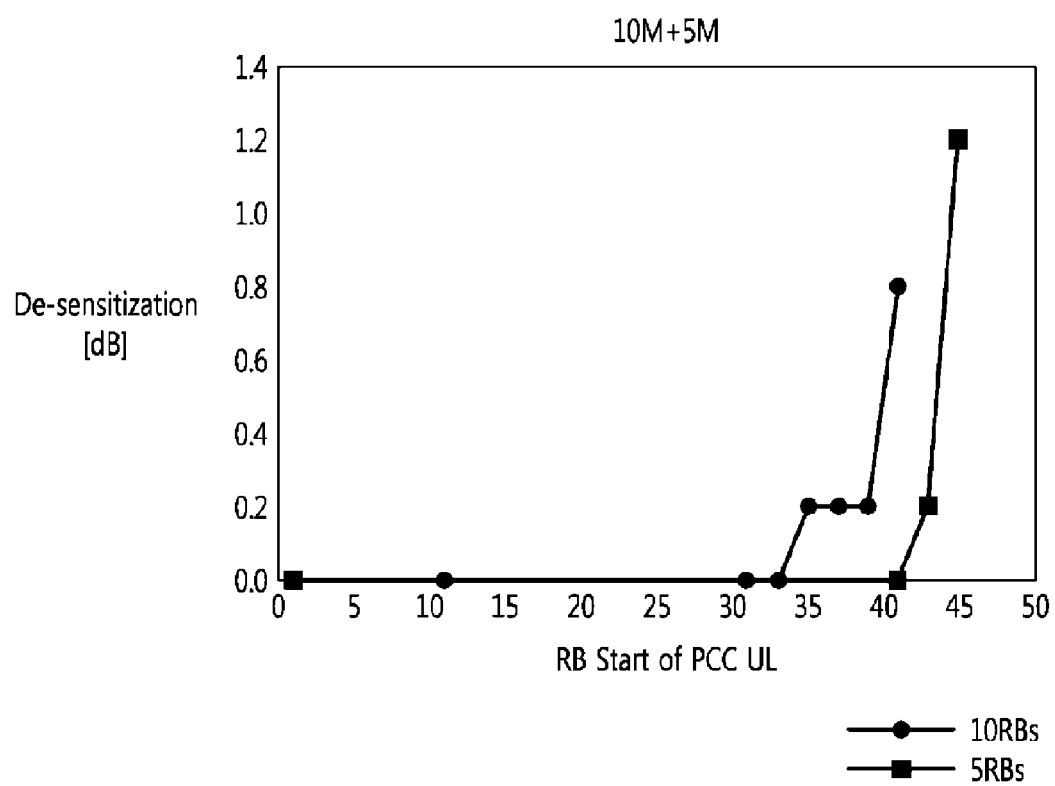

FIG. 19B illustrates desensitization levels for reception sensitivity when shifting the start point of an RB, with the resource allocation of uplink set as 5 RB or 10 RB in case the channel bandwidth of a primary component carrier (PCC) is 10 MHz (i.e., 50 RB) and the channel bandwidth of a secondary component carrier (SCC) is 5 MHz (i.e., 25 RB). Table 17 represents in detail the result of FIG. 19B.

TABLE 17

| $\Delta F_{block}$ | SCC center frequency(Fc) | UL RB count | Start point of RB | Reception sensitivity | Desensitization level |
|---|---|---|---|---|---|
| 50 | 1932.5 | 10 | 1 | −96.5 | 0.0 |
| 50 | 1932.5 | 10 | 11 | −96.5 | 0.0 |
| 50 | 1932.5 | 10 | 31 | −96.5 | 0.0 |
| 50 | 1932.5 | 10 | 33 | −96.5 | 0.0 |
| 50 | 1932.5 | 10 | 35 | −96.3 | 0.2 |
| 50 | 1932.5 | 10 | 37 | −96.3 | 0.2 |
| 50 | 1932.5 | 10 | 39 | −96.3 | 0.2 |
| 50 | 1932.5 | 10 | 41 | −95.7 | 0.8 |
| 50 | 1932.5 | 5 | 1 | −96.5 | 0.0 |
| 50 | 1932.5 | 5 | 41 | −96.5 | 0.0 |
| 50 | 1932.5 | 5 | 43 | −96.3 | 0.2 |
| 50 | 1932.5 | 5 | 45 | −95.3 | 1.2 |

Figure 19C:
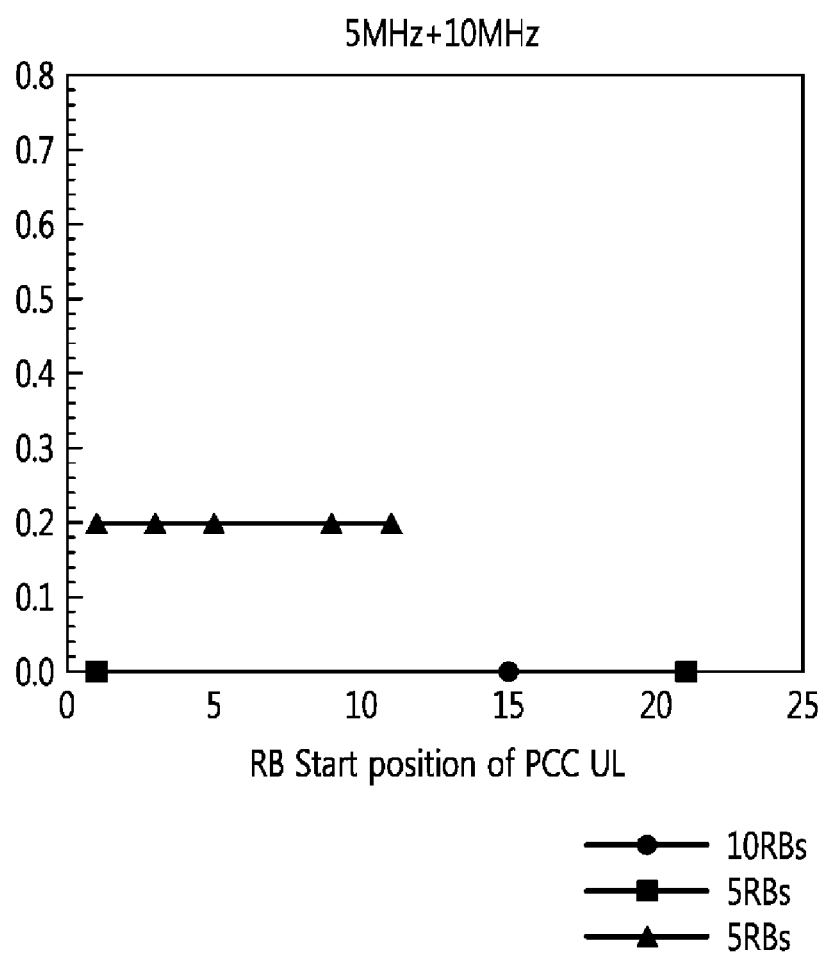

FIG. 19C illustrates desensitization levels for reception sensitivity when shifting the start point of an RB, with the resource allocation of uplink set as 5 RB or 10 RB in case the channel bandwidth of a primary component carrier (PCC) is 5 MHz (i.e., 25 RB) and the channel bandwidth of a secondary component carrier (SCC) is 10 MHz (i.e., 50 RB). Table 18 represents in detail the result of FIG. 19C.

TABLE 18

| $\Delta F_{block}$ | SCC center frequency(Fc) | UL RB count | Start point of RB | Reception sensitivity | Desensitization level |
|---|---|---|---|---|---|
| 50 | 1935 | 10 | 1 | −93.5 | 0.0 |
| 50 | 1935 | 10 | 15 | −93.5 | 0.0 |
| 50 | 1935 | 5 | 1 | −93.5 | 0.0 |
| 50 | 1935 | 5 | 21 | −93.5 | 0.0 |
| 50 | 1935 | 15 | 1 | −93.3 | 0.2 |
| 50 | 1935 | 15 | 3 | −93.3 | 0.2 |
| 50 | 1935 | 15 | 5 | −93.3 | 0.2 |
| 50 | 1935 | 15 | 9 | −93.3 | 0.2 |
| 50 | 1935 | 15 | 11 | −93.3 | 0.2 |

Figure 19D:
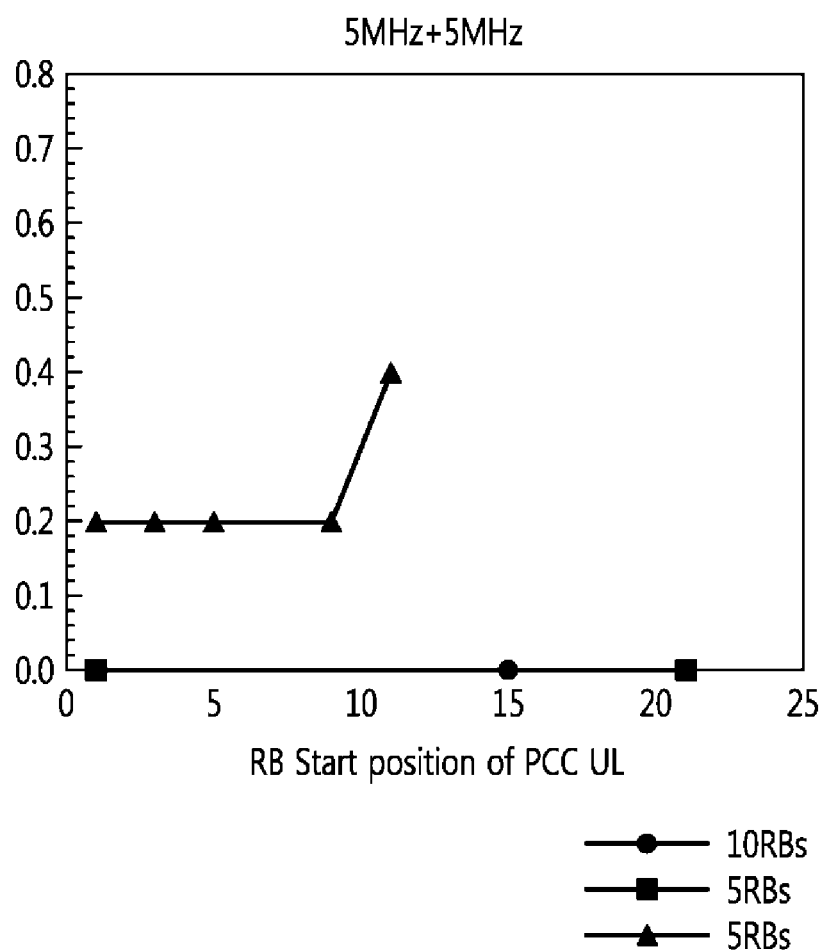

FIG. 19D illustrates desensitization levels for reception sensitivity when shifting the start point of an RB, with the resource allocation of uplink set as 5 RB or 10 RB in case the channel bandwidth of a primary component carrier (PCC) is 5 MHz (i.e., 25 RB) and the channel bandwidth of a secondary component carrier (SCC) is 5 MHz (i.e., 25 RB). Table 19 represents in detail the result of FIG. 19D.

TABLE 19

| $\Delta F_{block}$ | SCC center frequency(Fc) | UL RB count | Start point of RB | Reception sensitivity | Desensitization level |
|---|---|---|---|---|---|
| 55 | 1932.5 | 10 | 1 | −96.5 | 0.0 |
| 55 | 1932.5 | 10 | 15 | −96.5 | 0.0 |
| 55 | 1932.5 | 5 | 1 | −96.5 | 0.0 |
| 55 | 1932.5 | 5 | 21 | −96.5 | 0.0 |
| 55 | 1932.5 | 15 | 1 | −96.3 | 0.2 |
| 55 | 1932.5 | 15 | 5 | −96.3 | 0.2 |
| 55 | 1932.5 | 15 | 7 | −96.3 | 0.2 |
| 55 | 1932.5 | 15 | 9 | −96.3 | 0.2 |
| 55 | 1932.5 | 15 | 11 | −96.1 | 0.4 |

Referring to the results shown in FIGS. 19A to 19D, it can be seen that when the channel bandwidth of the primary component carrier (PCC) is 10 MHz (i.e., 50 RB), and the channel bandwidth of the secondary component carrier (SCC) is 5 MHz (i.e., 25 RB) as illustrated in FIG. 19B, the desensitization level is largest. Accordingly, when the channel bandwidth of the primary component carrier (PCC) is 10 MHz (i.e., 50 RB), and the channel bandwidth of the secondary component carrier (SCC) is 5 MHz (i.e., 25 RB), the start point of the RB can be limited to the $33^{rd}$ one so as to avoid desensitization. Further, even when the channel bandwidth of the primary component carrier (PCC) is 10 MHz (i.e., 50 RB), and the channel bandwidth of the secondary component carrier (SCC) is 10 MHz (i.e., 50 RB) as shown in FIG. 19A, it can be seen that slight desensitization takes place. Accordingly, in this case, the start point of the RB may be limited to the seventh one.

In sum, when two downlink carriers are used and only one uplink carrier is used, the number of RBs of the uplink resource allocation may be limited to 10 in order to avoid desensitization due to transmission leakage, so that it is needed to make sure that the transmission leakage is within −109 dBm for the 5 MHz channel bandwidth (i.e., 25 RB) and is within −106 dBm for the 10 MHz channel bandwidth (i.e., 40 RB). Further, when the channel bandwidth of the primary component carrier (PCC) is 10 MHz (i.e., 50 RB), and the channel bandwidth of the secondary component carrier (SCC) is 5 MHz (i.e., 25 RB), the start point of the RB needs to be limited to the $33^{rd}$ one.

The above can be summarized in the following table.

TABLE 20

| CA configuration | Aggregated channel bandwidth (PCC + SCC) | $\Delta F_{block}$/[MHz] | PCC allocation | Duplex mode |
|---|---|---|---|---|
| CA_25A_25A | 25 RB + 25 RB | [30.0] < $\Delta F_{block}$ ≤ 55.0 | [10] | FDD |
| | | 0.0 < $\Delta F_{block}$ ≤ [30.0] | [25]1 | |
| | 25 RB + 50 RB | [25.0] < $\Delta F_{block}$ ≤ 50.0 | [10] | |
| | | 0.0 < $\Delta F_{block}$ ≤ [25.0] | [25]1 | |
| | 50 RB + 25 RB | [15.0] < $\Delta F_{block}$ ≤ 50.0 | [10]4 | |
| | | 0.0 < $\Delta F_{block}$ ≤ [15.0] | [32]1 | |
| | 50 RB + 50 RB | [10.0] < $\Delta F_{block}$ ≤ 45.0 | [10]5 | |
| | | 0.0 < $\Delta F_{block}$ ≤ [10.0] | [32]1 | |

In the above table, footnote 1 means that the RB of uplink resource allocation is as adjacent to the downlink operating band as possible, but is confined in the transmission.

In the above table, ΔFblock means a gap between two sub-blocks. NOTE3: in the above table, footnote 4 means that in the uplink resource allocation, the start point of an RB should be limited to the $33^{rd}$ one.

In the above table, footnote 5 means that in the uplink resource allocation, the start point of an RB should be limited to the seventh one.

Figure 20:
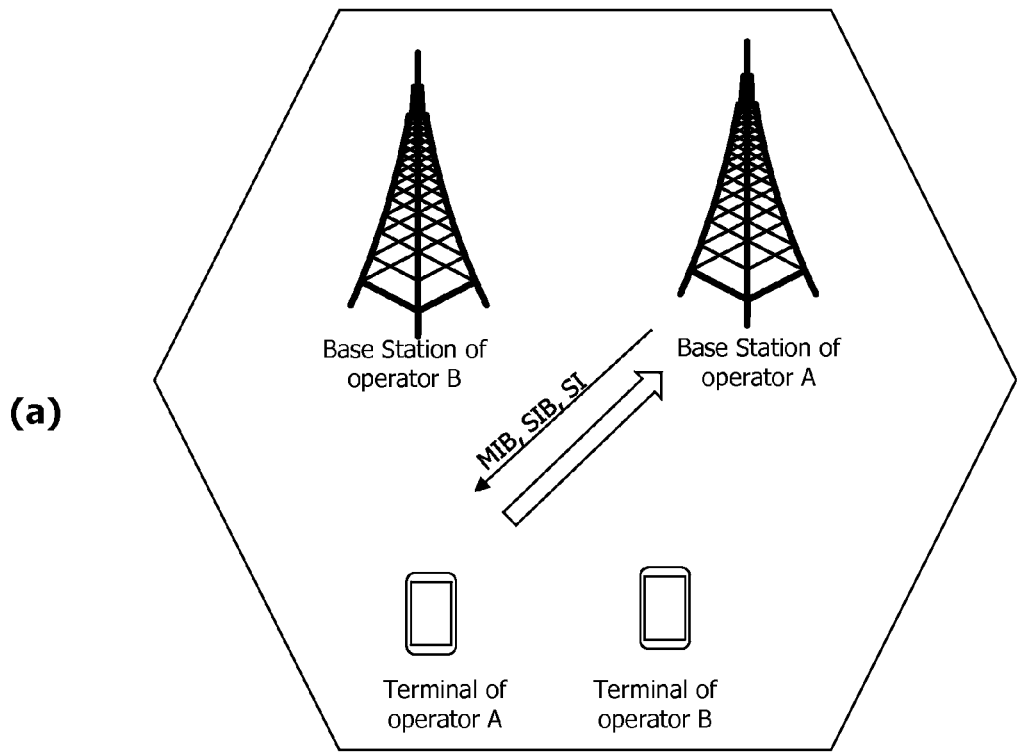
FIG. 20 illustrates the operation of a terminal according to the present disclosure.
Figure 20:
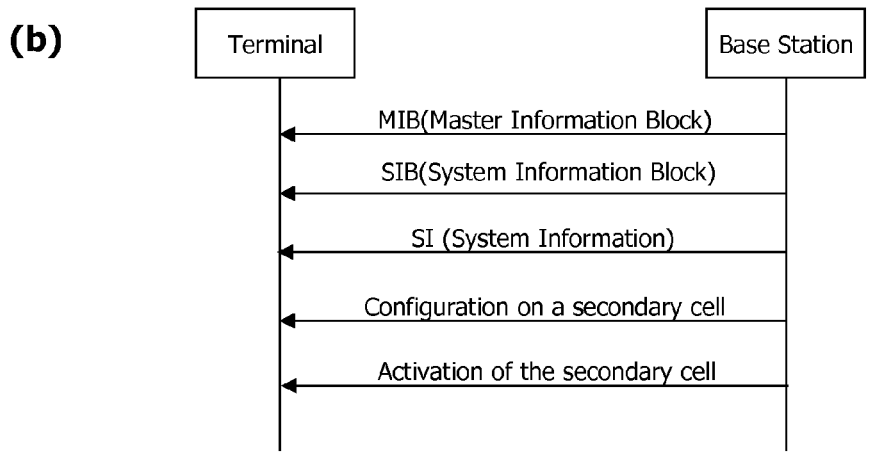

FIG. 20 illustrates the operation of a terminal according to the present disclosure.

Referring to FIG. 20(a), an example is shown where service provider A and service provider B simultaneously provide services at a specific area.

Under such circumstance, as shown in FIG. 20(b), service provider A's base station transmits a master information block (MIB) and a system information block (SIB).

The system information block (SIB) may include one or more of information on the operating band in use among the operating bands shown in Table 2, information on an uplink (UL) bandwidth, and information on an uplink (UL) carrier frequency. The information on the uplink (UL) bandwidth may include information on the number of resource blocks (RBs).

At this time, in case service provider A's has carrier aggregation configured and the carrier aggregation is activated, it is determined whether the configured carrier aggregation (CA) corresponds to intra-band non-contiguous CA. The configuration of the carrier aggregation may be conducted by receiving a secondary cell's configuration. Further, the activation of the carrier aggregation may be carried out by receiving a signal for activation of the secondary cell.

In case the configured carrier aggregation (CA) corresponds to the intra-band non-contiguous CA, service provider A's base station assigns an uplink resource using the number of RBs and the start point of an RB, suggested in the above table, and when service provider A's terminal conducts transmission using the number of RBs assigned at the RB start point, a test for reference sensitivity is carried out, and only the terminal that passed the test is preferably determined to satisfy required RF performance and is to be released in the market.

The embodiments of the present invention may be implemented by various means. For example, the embodiments of the present invention may be implemented in hardware, firmware, software or a combination thereof.

When implemented in hardware, the methods according to the embodiments of the present invention may be embedded in one or more of ASICs (application specific integrated circuits), DSPs (digital signal processors), DSPDs (digital signal processing devices), PLDs (programmable logic devices), FPGAs (field programmable gate arrays), processors, controllers, microcontrollers, and microprocessors.

When implemented in firmware or software, the methods according to the embodiments of the present invention may be implemented in the form of modules, procedures, or functions that perform the above-described functions or operations. The software codes may be stored in the memory units and may be driven by the processors. The memory units may be positioned inside or outside the processors and may communicate data with the processors by various known means.

Figure 21:
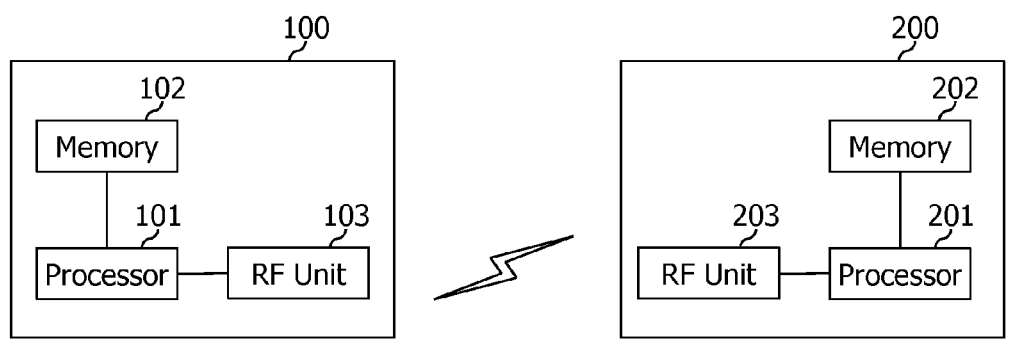
FIG. 21 is a block diagram illustrating a wireless communication system where an embodiment of the present invention is implemented.

FIG. 21 is a block diagram illustrating a wireless communication system where an embodiment of the present invention is implemented.

The base station 200 includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

The present invention may be used in a terminal, a base station, or other equipment of a wireless mobile communication system.

The invention claimed is:

1. A method of receiving an allocation of resource blocks (RBs) for an uplink signal, the method performed by a user terminal and comprising:
   receiving, from a base station via a transceiver of the user terminal adapted to configure a carrier aggregation (CA), a physical downlink control channel (PDCCH) including the allocation of RBs used for the uplink signal;
   checking, by a processor of the user terminal, a number of the allocated RBs if the configured CA corresponds to an intra-band CA and also corresponds to a non-contiguous CA; and
   transmitting, via the transceiver, the uplink signal to the base station on a primary component carrier using the allocated RBs,
   wherein if a channel bandwidth by an aggregation of the primary component carrier and a secondary component carrier is at least one of 50 RBs, 75 RBs or 100 RBs and if a gap between two sub-blocks corresponds to a predetermined range, the checked number of the allocated RBs in the primary component carrier is equal to or less than 10 to meet a requirement for a reference sensitivity on a downlink of the secondary component carrier.

2. The method of claim 1, wherein the primary and secondary component carriers correspond to band 25.

3. The method of claim 1, wherein the predetermined range for the gap is varied according to the channel bandwidth of the primary component carrier and the channel bandwidth of the secondary component carrier.

4. The method of claim 1, wherein the predetermined range for the gap is varied according to whether the channel bandwidth of the primary component carrier is 25 RBs or 50 RBs and according to whether the channel bandwidth of the secondary component carrier is 25 RBs or 50 RBs.

5. The method of claim 1, wherein if a channel bandwidth of the primary component carrier is 25 RBs, if a channel bandwidth of the secondary component carrier is 25 RBs and if the gap is greater than 30MHz, but less than 55 MHz, the checked number of the allocated RBs is equal to or less than 10.

6. The method of claim 1, wherein if a channel bandwidth of the primary component carrier is 25 RBs, if a channel bandwidth of the secondary component carrier is 50 RBs and if the gap is greater than 25 MHz, but less than 50 MHz, the checked number of the allocated RBs is equal to or less than 10.

7. The method of claim 1, wherein if a channel bandwidth of the primary component carrier is 50 RBs, if a channel bandwidth of the secondary component carrier is 25 RBs and if the gap is greater than 15MHz, but less than 50 MHz, the checked number of the allocated RBs is equal to or less than 10.

8. The method of claim 1, wherein if a channel bandwidth of the primary component carrier is 50 RBs, if a channel bandwidth of the secondary component carrier is 50 RBs and if the gap is greater than 10 MHz, but less than 45 MHz, the checked number of the allocated RBs is equal to or less than 10.

9. The method of claim 8, wherein if the channel bandwidth of the primary component carrier is 50 RBs, if the channel bandwidth of the secondary component carrier is 25 RBs and if the gap is greater than 15 MHz, but less than 50 MHz, a start point of the allocated RBs is a thirty third.

10. A user terminal comprising:
- a transceiver adapted to configure a carrier aggregation (CA);
- a processor operatively connected to the transceiver and configured to:
  - cause the transceiver to receive, from a base station, a physical downlink control channel (PDCCH) including allocation of resource blocks (RBs) used for an uplink signal;
  - check a number of the allocated RBs if the configured CA corresponds to an intra-band CA and also corresponds to a non-contiguous CA; and
  - cause the transceiver to transmit the uplink signal to the base station on a primary component carrier using allocated RBs, if the CA is configured, if the configured CA corresponds to the intra-band CA, and if the configured CA corresponds to the non-contiguous CA,
- wherein if a channel bandwidth by an aggregation of the primary component carrier and a secondary component carrier is at least one of 50 RBs, 75 RBs or 100 RBs and if a gap between two sub-blocks corresponds to a predetermined range, the checked number of the allocated RBs in the primary component carrier is equal to or less than 10 to meet a requirement for a reference sensitivity on a downlink of the secondary component carrier.

11. The terminal of claim 10, wherein the primary and secondary component carriers correspond to band 25.

12. The terminal of claim 10, wherein the predetermined range for the gap is varied according to the channel bandwidth of the primary component carrier and the channel bandwidth of the secondary component carrier.

13. The terminal of claim 10, wherein the predetermined range for the gap is varied according to whether the channel bandwidth of the primary component carrier is 25 RBs or 50 RBs and according to whether the channel bandwidth of the secondary component carrier is 25 RBs or 50 RBs.

14. The terminal of claim 10, wherein if a channel bandwidth of the primary component carrier is 25 RBs, if a channel bandwidth of the secondary component carrier is 25 RBs and if the gap is greater than 30 MHz, but less than 55 MHz, the checked number of the allocated RBs is equal to or less than 10.

15. The terminal of claim 10, wherein if a channel bandwidth of the primary component carrier is 25 RBs, if a channel bandwidth of the secondary component carrier is 50 RBs and if the gap is greater than 25 MHz, but less than 50 MHz, the checked number of the allocated RBs is equal to or less than 10.

16. The terminal of claim 10, wherein if a channel bandwidth of the primary component carrier is 50 RBs, if a channel bandwidth of the secondary component carrier is 25 RBs and if the gap is greater than 15 MHz, but less than 50 MHz, the checked number of the allocated RBs is equal to or less than 10.

17. The terminal of claim 10, wherein if a channel bandwidth of the primary component carrier is 50 RBs, if a channel bandwidth of the secondary component carrier is 50 RBs and if the gap is greater than 10 MHz, but less than 45 MHz, the checked number of the allocated RBs is equal to or less than 10.

18. The terminal of claim 17, wherein if the channel bandwidth of the primary component carrier is 50 RBs, if the channel bandwidth of the secondary component carrier is 25 RBs and if the gap is greater than 15 MHz, but less than 50 MHz, a start point of the allocated RBs is a thirty third RB.

* * * * *